United States Patent
Shundo et al.

(10) Patent No.: US 7,541,071 B2
(45) Date of Patent: Jun. 2, 2009

(54) LIQUID-CRYSTALLINE (METH) ACRYLATE DERIVATIVES AND COMPOSITION CONTAINING THEM

(75) Inventors: Ryushi Shundo, Chiba (JP); Tomohiro Eto, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 675 days.

(21) Appl. No.: 11/017,809

(22) Filed: Dec. 22, 2004

(65) Prior Publication Data

US 2006/0054859 A1     Mar. 16, 2006

(30) Foreign Application Priority Data

Dec. 25, 2003  (JP)  .............................. 2003-430688
Nov. 16, 2004  (JP)  .............................. 2004-331415

(51) Int. Cl.
C09K 19/20   (2006.01)
C09K 19/38   (2006.01)
C07C 69/76   (2006.01)
C07C 69/92   (2006.01)
C07C 255/50  (2006.01)

(52) U.S. Cl. .............. 428/1.1; 252/299.64; 252/299.65; 252/299.67; 558/415; 558/416; 560/85; 560/89; 560/90; 560/95; 560/100

(58) Field of Classification Search .................. 428/1.1; 252/299.01, 299.64, 299.65, 299.67; 560/85, 560/89, 90, 95, 100; 558/415, 416
See application file for complete search history.

(56) References Cited

U.S. PATENT DOCUMENTS

| | | |
|---|---|---|
| 5,560,864 A | 10/1996 | Goulding |
| 5,569,727 A | 10/1996 | Mormann et al. |
| 5,793,456 A | 8/1998 | Broer et al. |
| 6,344,154 B1 | 2/2002 | Coates et al. |
| 6,597,426 B1 | 7/2003 | Siemensmeyer et al. |
| 2004/0173775 A1 | 9/2004 | Suermann et al. |

FOREIGN PATENT DOCUMENTS

| | | | |
|---|---|---|---|
| GB | 2 338 240 | | 12/1999 |
| JP | 2000-119223 | * | 4/2000 |
| JP | 2001-55573 | | 2/2001 |
| JP | 2001-154019 | | 6/2001 |

OTHER PUBLICATIONS

English translation by computer for JP 2000-119223, http://www4.ipdl.inpit.go.jp/Tokujitu/PAJdetail.ipdl?N0000=60&N0120=01&N2001=2&N3001=2000-119223.*

Eiichi Akiyama et al., "Side-chain type liquid-crystalline polyethers, 2$^{a)}$ Effects of mesogenic moieties on the thermal properties and their self-assembly behaviour", Macromol. Chem. Phys., 196, pp. 3391-3414, 1995.

D.J. Broer, et al., "Synthesis and Photopolymerization of a Liquid-Crystalline Diepoxide", Macromolecules, 26, pp. 1244-1247, 1993.

S. Jahromi, "Synthesis and photoinitiated polymerization of liquid crystalline diepoxides", Polymer, vol. 35, No. 3, pp. 622-627, 1994.

* cited by examiner

*Primary Examiner*—Shean C Wu
(74) *Attorney, Agent, or Firm*—Wenderoth, Lind & Ponack, L.L.P.

(57) ABSTRACT

The compound of the invention is represented by Formula (1a) or Formula (1b)

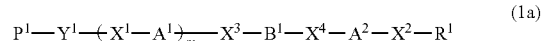

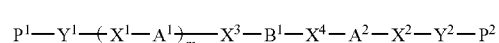

wherein $R^1$ is a monovalent group; $P^1$ and $P^2$ are a monovalent group having an acrylic group and a hydroxyl group; $A^1$, $A^2$, and $B^1$ are a divalent cyclic group; $X^1$, $X^2$, $X^3$, $X^4$, $Y^1$ and $Y^2$ are a bonding group.

37 Claims, No Drawings

LIQUID-CRYSTALLINE (METH) ACRYLATE DERIVATIVES AND COMPOSITION CONTAINING THEM

FIELD OF THE INVENTION

The present invention relates to a polymerizable liquid-crystalline compound having at least one hydroxyl group (—OH) in the side chain thereof, a composition containing the compound, their polymers, and their applications.

BACKGROUND OF THE INVENTION

When a polymerizable liquid-crystal compound aligned in a nematic state is polymerized, then its aligned state is fixed and an optically-anisotropic shaped article is obtained. The optically-anisotropic shaped article is usable as an optically-compensatory film for liquid-crystal display devices. As the polymerizable liquid-crystal compound, used is a compound having an acrylic group that serves as a polymerizable reactive group.

For producing an optically-compensatory film, a polymerizable liquid-crystal composition containing a suitable photopolymerization initiator added thereto is first applied onto a substrate such as aligned triacetyl cellulose (hereinafter abbreviated to as TAC). Next, the polymerizable liquid-crystal composition is polymerized through irradiation electron rays such as UV rays to obtain an optically-anisotropic film in which the liquid crystal alignment is fixed (e.g., Patent Reference 1 and Patent Reference 2).

Patent Reference 1: JP-A 2001-55573
Patent Reference 2: JP-A 2001-154019

The step of irradiation with UV rays is desired to satisfy the following three conditions.

1) Room-temperature polymerization not requiring any specific heating device.

2) Open-air polymerization not requiring purging with inert gas such as nitrogen.

3) Polymerization through irradiation with UV rays for a few seconds.

When a conventional acrylic polymerizable liquid-crystal material is formed into an optically-anisotropic film according to the above-mentioned production process, then it brings about the following two problems.

1) In the mode of open-air UV curing, oxygen in air retards the curing, and a cured film could not be obtained.

2) Since its adhesiveness to the film substrate, TAC is poor, the cured optically-anisotropic film peels from TAC.

Accordingly, a polymerizable liquid-crystal compound and its composition capable of solving these problems are desired.

SUMMARY OF THE INVENTION

We, the present inventors have found that the compound and the composition containing the compound of the invention exhibit good polymerizability in air and give a polymer having a high degree of polymerization through irradiation with light for a short period of time, and a film fabricated by aligning and polymerizing the compound or the composition containing the compound of the invention has good adhesiveness to TAC, and have completed the present invention. The invention has the following constitution.

[1] A compound represented by Formula (1a) or Formula (1b):

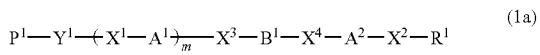

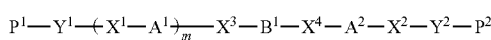

wherein $R^1$ is hydrogen, fluorine, chlorine, —CN, —NCO, —NCS, —CF$_3$, —OCF$_3$, —OCHF$_2$, or alkyl having 1 to 20 carbon atoms, any —CH$_2$— in the alkyl may be replaced by —O—, —S—, —COO—, —OCO—, —CO—, —CH=CH— or —C≡C—, any hydrogen in the alkyl may be replaced by halogen, cyano or methyl; when $R^1$ is alkyl having 1 to 20 carbon atoms and when any hydrogen in the alkyl is replaced by halogen, cyano or methyl, then $R^1$ may be an optically-active group; $Y^1$ and $Y^2$ are independently alkylene having 1 to 15 carbon atoms, any —CH$_2$— in the alkylene may be replaced by —O—, —S—, —COO—, —OCO— or —CO—, any hydrogen in the alkylene may be replaced by halogen, cyano or methyl, and when any hydrogen in the alkylene is replaced by halogen, cyano or methyl, then $Y^1$ or $Y^2$ may be an optically-active group; $A^1$ and $A^2$ are independently 1,4-cyclohexylene, 1,4-cyclohexenylene, 1,4-phenylene, pyridine-2,5-diyl, pyridazine-3,6-diyl, pyrimidine-2,5-diyl, naphthalene-2,6-diyl, tetrahydronaphthalene-2,6-diyl, biphenyl-4,4'-diyl, 1,3-dioxane-2,5-diyl, 1,4-cyclohexylene in which at least one hydrogen is replaced by fluorine, or 1,4-phenylene in which at least one hydrogen is replaced by halogen, —CN, —CH$_3$, —CH$_2$CH$_3$, —OCH$_3$, —OH, —CHO, —OCOCH$_3$, —COCH$_3$, —COCF$_3$, —CF$_3$ or —CF$_2$H; $B^1$ is 1,4-cyclohexylene, 1,4-phenylene, naphthalene-2,6-diyl, tetrahydronaphthalene-2,6diyl, biphenyl-4,4'-diyl, fluorene-2,7-diyl, 9-methylfluorene-2,7-diyl, 9-ethylfluorene-2,7-diyl, 9,9-dimethylfluorene-2,7-diyl, 9-chlorofluorene-2,7-diyl, 9,9-difluorofluorene-2,7-diyl, anthracene-2,7-diyl, anthracene-5,10-diyl, phenanthrene-2,7-diyl, pentacene-2,8-diyl, pyridazine-3,6-diyl, 1,4-phenylene in which at least one hydrogen is replaced by halogen, —CH$_3$, —CH$_2$CH$_3$, —OCH$_3$, —OCH$_2$CH$_3$, —CN, —COCH$_3$, —OCOCH$_3$, —CHO, —OH, —COCF$_3$, —CF$_3$, phenyl or toluyl, or a group represented by any one of Formula (K1) to Formula (K3); $X^1$ and $X^2$ are independently a single bond, —O—, —S—, —COO— or —OCO—; $X^3$ and $X^4$ are independently a single bond, —COO—, —OCO—, —OCH$_2$—, —CH$_2$O—, —OCF$_2$—, —CF$_2$O—, —CH$_2$CH$_2$—, —CH=CH—COO— or —C≡C—; m is 0, 1 or 2, when m is 2, then two $X^1$'s and two $A^1$'s both may be the same group or different groups; $P^1$ and $P^2$ are independently a group represented by any one of Formula (P1) to Formula (P4); when $X^3$ is a single bond and $A^2$ and $B^1$ are 1,4-phenylene or 1,4-phenylene in which any hydrogen is replaced by methyl, ethyl or halogen, then $X^4$ is —COO—, —OCO—, —OCH$_2$—, —CH$_2$O—, —OCF$_2$—, —CF$_2$O—, —CH$_2$CH$_2$—, —CH=CH—COO— or —C≡C—:

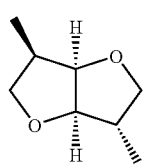

(K1)

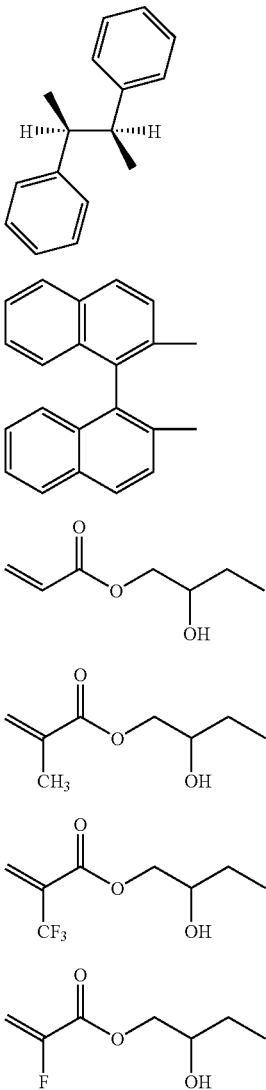

(K2)

(K3)

(P1)

(P2)

(P3)

(P4)

[2] The compound described in item [1], wherein $R^1$ is hydrogen, fluorine, chlorine, —CN, —NCO, —NCS, —CF$_3$, —OCF$_3$, —OCHF$_2$, or alkyl having 1 to 10 carbon atoms, any —CH$_2$— in the alkyl may be replaced by —O—, —S—, —COO—, —OCO—, —CO—, —CH═CH— or —C≡C—, any hydrogen in the alkyl may be replaced by halogen, cyano or methyl; when $R^1$ is alkyl having 1 to 10 carbon atoms and when any hydrogen in the alkyl is replaced by halogen, cyano or methyl, then $R^1$ may be an optically-active group; $Y^1$ and $Y^2$ are independently alkylene having 1 to 12 carbon atoms, any —CH$_2$— in the alkylene may be replaced by —O—, —COO—, —OCO— or —CO—, any hydrogen in the alkylene may be replaced by halogen, cyano or methyl, and when any hydrogen in the alkylene is replaced by halogen, cyano or methyl, then $Y^1$ or $Y^2$ may be an optically-active group; $A^1$ and $A^2$ are independently 1,4-cyclohexylene, 1,4-cyclohexenylene, 1,4-phenylene, pyridine-2,5-diyl, pyridazine-3,6-diyl, pyrimidine-2,5-diyl, 1,3-dioxane-2,5-diyl, or 1,4-phenylene in which at least one hydrogen is replaced by halogen, —CN, —CH$_3$, —CH$_2$CH$_3$, —CF$_3$ or —CF$_2$H; $B^1$ is 1,4-phenylene, naphthalene-2,6-diyl, tetrahydronaphthalene-2,6-diyl, biphenyl-4,4'-diyl, fluorene-2,7-diyl, 9-methylfluorene-2,7-diyl, 9-ethylfluorene-2,7-diyl, 9,9-dimethylfluorene-2,7-diyl, 9-chlorofluorene-2,7-diyl, 9,9-difluorofluorene-2,7-diyl, anthracene-2,7-diyl, anthracene-5,10-diyl, phenanthrene-2,7-diyl, 1,4-phenylene in which at least one hydrogen is replaced by halogen, —CH$_3$, —CH$_2$CH$_3$, —OCH$_3$, —OCH$_2$CH$_3$, —CN, —COCH$_3$, —OCOCH$_3$, —CHO, —OH, —COCF$_3$, —CF$_3$, phenyl or toluyl, or a group represented by any one of Formula (K1) to Formula (K3); $X^1$ and $X^2$ are independently a single bond, —O—, —COO— or —OCO—; $X^3$ and $X^4$ are independently a single bond, —COO—, —OCO—, —OCH$_2$—, —CH$_2$O—, —OCF$_2$—, —CF$_2$O—, —CH$_2$CH$_2$—, —CH═CH—COO— or —C≡C—; m is 0, 1 or 2, when m is 2, then two $X^1$'s and two $A^1$'s both may be the same group or different groups; $P^1$ and $P^2$ are independently a group represented by any one of Formula (P1) to Formula (P4).

[3] The compound described in item [1], wherein $R^1$ is hydrogen, fluorine, chlorine, —CN, —CF$_3$, —OCF$_3$, —OCHF$_2$, alkyl having 1 to 10 carbon atoms, alkenyl having 2 to 10 carbon atoms, or alkoxy having 1 to 10 carbon atoms, any hydrogen in the alkyl, alkenyl or alkoxy may be replaced by fluorine, chlorine, cyano or methyl; when $R^1$ is alkyl having 1 to 10 carbon atoms, alkenyl having 2 to 10 carbon atoms or alkoxy having 1 to 10 carbon atoms and when any hydrogen in these groups is replaced by halogen, cyano or methyl, then $R^1$ may be an optically-active group; $Y^1$ and $Y^2$ are independently alkylene having 1 to 10 carbon atoms, any —CH$_2$— in the alkylene may be replaced by —O—, —COO—, —OCO— or —CO—, any hydrogen in the alkylene may be replaced by halogen, cyano or methyl, and when any hydrogen in the alkylene is replaced by halogen, cyano or methyl, then $Y^1$ or $Y^2$ may be an optically-active group; $A^1$ and $A^2$ are independently 1,4-cyclohexylene, 1,4-cyclohexenylene, 1,4-phenylene, pyridine-2,5-diyl, pyridazine-3,6-diyl, pyrimidine-2,5-diyl, 1,3-dioxane-2,5-diyl, or 1,4-phenylene in which at least one hydrogen is replaced by fluorine, chlorine, —CN, —CH$_3$, —CH$_2$CH$_3$, —CF$_3$ or —CF$_2$H; $B^1$ is 1,4-phenylene, naphthalene-2,6-diyl, tetrahydronaphthalene-2,6-diyl, biphenyl-4,4'-diyl, fluorene-2,7-diyl, 9-methylfluorene-2,7-diyl, 9-ethylfluorene-2,7-diyl, 9,9-dimethylfluorene-2,7-diyl, 9-chlorofluorene-2,7-diyl, 9,9-difluorofluorene-2,7-diyl, anthracene-2,7-diyl, anthracene-5,10-diyl, phenanthrene-2,7-diyl, 1,4-phenylene in which at least one hydrogen is replaced by fluorine, chlorine, —CH$_3$, —CH$_2$CH$_3$, —CN, —OH, —COCH$_3$, —COCF$_3$ or —CF$_3$, or a group represented by any one of Formula (K1) to Formula (K3); $X^1$ and $X^2$ are independently a single bond or —O—; $X^3$ and $X^4$ are independently a single bond, —COO—, —OCO—, —CH$_2$CH$_2$—, —CH═CH—COO— or —C≡C—; m is 0, 1 or 2, when m is 2, then two $X^1$'s and two $A^1$'s both may be the same group or different groups; $P^1$ and $P^2$ are independently a group represented by any one of Formula (P1) to Formula (P4).

[4] The compound described in item [1], wherein $R^1$ is hydrogen, fluorine, chlorine, —CN, —CF$_3$, —OCF$_3$, alkyl having 1 to 10 carbon atoms, or alkoxy having 1 to 10 carbon atoms, any hydrogen in the alkyl or alkoxy may be replaced by fluorine, chlorine, —CN or —CH$_3$; when $R^1$ is alkyl having 1 to 10 carbon atoms or alkoxy having 1 to 10 carbon atoms and when any hydrogen in these groups is replaced by fluorine, chlorine —CN or —CH$_3$, then $R^1$ may be an optically-active group; $Y^1$ and $Y^2$ are independently alkylene having 1 to 10 carbon atoms, any —CH$_2$— in the alkylene may be replaced by —O—, —COO— or —OCO—, any hydrogen in the alkylene may be replaced by fluorine, chlorine, —CN or —CH$_3$, and when any hydrogen in the alkylene is replaced by fluorine, chlorine, —CN or —CH$_3$, then $Y^1$ or $Y^2$ may be an optically-active group; $A^1$ and $A^2$ are independently 1,4-cyclohexylene, 1,4-cyclohexenylene, 1,4-phenylene, pyridine-2,5-diyl, pyridazine-3,6-diyl, pyrimidine-2,5-diyl, 1,3-dioxane-2,5-diyl, or 1,4-phenylene in which at least one hydrogen is replaced by fluorine, chlorine, —CN, —CH$_3$, —CF$_3$ or —CF$_2$H; B$^1$ is 1,4-phenylene, naphthalene-2,6-diyl, tetrahydronaphthalene-2,6-diyl, biphenyl-4,4'-diyl, fluorene-2,7-diyl, 9-methylfluorene-2,7-diyl, 9-ethylfluorene-2,7-diyl, 9,9-difluorofluorene-2,7-diyl, anthracene-2,7-diyl, phenanthrene-2,7-diyl, 1,4-phenylene in which at least one hydrogen is replaced by fluorine, chlorine, —CH$_3$, —CN, —OH or —CF$_3$, or a group represented by any one of Formula (K1) to Formula (K3); X$^1$ and X$^2$ are independently a single bond or —O—; X$^3$ and X$^4$ are independently a single bond, —COO—, —OCO—, —CH$_2$CH$_2$—, —CH=CH—COO— or —C≡C—; m is 0, 1 or 2, when m is 2, then two X$^1$'s and two A$^1$'s both may be the same group or different groups; P$^1$ and P$^2$ are independently a group represented by any one of Formula (P1) to Formula (P4).

[5] The compound described in any one of items [1] to [4], wherein m is 0 or 1.

[6] The compound described in item [1] or [2], which is represented by Formula (1b) in which m is 0 or 1 and X$^3$ and X$^4$ are independently a single bond, —COO—, —OCO—, —OCH$_2$—, —CH$_2$O—, —CH$_2$CH$_2$—, —CH=CH—COO— or —C≡C—.

[7] The compound described in item [1], wherein R$^1$ is hydrogen, fluorine, —CN, —OCF$_3$, alkyl having 1 to 10 carbon atoms, or alkoxy having 1 to 10 carbon atoms, any hydrogen in the alkyl or alkoxy may be replaced by —CH$_3$, when R$^1$ is alkyl having 1 to 10 carbon atoms or alkoxy having 1 to 10 carbon atoms and any hydrogen in these groups is replaced by —CH$_3$, then R$^1$ may be an optically-active group; Y$^1$ and Y$^2$ are independently alkylene having 1 to 10 carbon atoms, and any —CH$_2$— in the alkylene may be replaced by —O—, —COO— or —OCO; A$^1$ and A$^2$ are independently 1,4-cyclohexylene, 1,4-phenylene, pyridine-2,5-diyl, or 1,4-phenylene in which at least one hydrogen is replaced by fluorine; B$^1$ is 1,4-phenylene, naphthalene-2,6-diyl, tetrahydronaphthalene-2,6-diyl, biphenyl-4,4'-diyl, fluorene-2,7-diyl, 9-methylfluorene-2,7-diyl, 9,9-difluorofluorene-2,7-diyl, anthracene-2,7-diyl, 1,4-phenylene in which at least one hydrogen is replaced by fluorine, chlorine, —CH$_3$, —CN, —OH or —CF$_3$, or a group represented by any one of Formula (K1) to Formula (K3); X$^1$ and X$^2$ are independently a single bond or —O—; X$^3$ and X$^4$ are independently a single bond, —COO—, —OCO—, —CH$_2$CH$_2$—, —CH=CH—COO— or —C≡C—; P$^1$ and P$^2$ are independently a group represented by Formula (P1); and m is 0 or 1.

[8] A liquid-crystal composition comprising at least one compound described in any one of items [1] to [7] and consisting of at least two compounds.

[9] A liquid-crystal composition comprising at least one compound described in any one of items [1] to [7] and consisting of at least two polymerizable compounds.

[10] A liquid-crystal composition consisting of at least two compounds described in any one of items [1] to [7].

[11] A liquid-crystal composition comprising at least one compound described in any one of items [1] to [7] and any other polymerizable compound.

[12] The liquid-crystal composition described in item [11], wherein the other polymerizable compound is at least one compound selected from a group of compounds represented by Formula (M1) and Formula (M2):

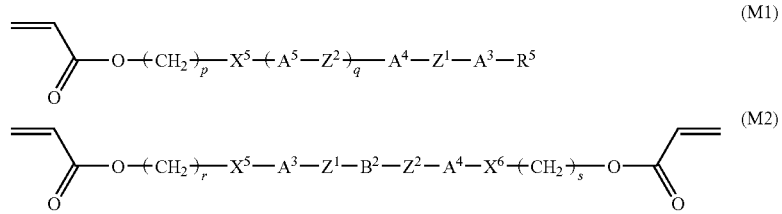

wherein R$^5$ is hydrogen, fluorine, chlorine, —CN, or alkyl having 1 to 20 carbon atoms; in the alkyl, any —CH$_2$— may be replaced by —O—, —S—, —COO—, —OCO— or —CO— and any hydrogen may be replaced by halogen; A$^3$, A$^4$ and A$^5$ are independently 1,4-cyclohexylene, 1,4-phenylene, pyridine-2,5-diyl, pyrimidine-2,5-diyl, naphthalene-2,6-diyl, fluorene-2,7-diyl, or 1,4-phenylene in which at least one hydrogen is replaced by fluorine or chlorine; B$^2$ is a single bond, 1,4-phenylene, naphthalene-2,6-diyl, biphenyl-4,4'-diyl, fluorene-2,7-diyl, 9-methylfluorene-2,7-diyl, 9-ethylfluorene-2,7-diyl, 9,9-dimethylfluorene-2,7-diyl, 9-chlorofluorene-2,7-diyl, 9,9-difluorofluorene-2,7-diyl, or 1,4-phenylene in which at least one hydrogen is replaced by halogen, —CH$_3$, —CH$_2$CH$_3$, —CF$_3$ or toluyl; Z$^1$ and Z$^2$ are independently a single bond, —COO—, —OCO—, —CH$_2$CH$_2$— or —C≡C—; X$^5$ and X$^6$ are independently a single bond or —O—; q is 1 or 0; p, r and s are independently an integer of 0 to 20.

[13] The liquid-crystal composition described in item [12], wherein the other polymerizable compound is at least one compound represented by Formula (M1).

[14] The liquid-crystal composition described in item [12], wherein the other polymerizable compound is at least one compound represented by Formula (M2).

[15] The liquid-crystal composition described in item [12], wherein the other polymerizable compound is at least one compound represented by Formula (M1) and at least one compound represented by Formula (M2).

[16] A polymer obtained by polymerizing the composition described in any one of items [9] to [15].

[17] A polymer obtained by polymerizing at least one compound described in item [1].

[18] An optically-anisotropic shaped article comprising the polymer described in item [16] or [17].

[19] The shaped article described in item [18], which is a film showing hybrid alignment.

[20] The shaped article described in item [18], which is a film showing homogeneous alignment.

[21] The shaped article described in item [18], which is a film showing tilted alignment.

[22] The shaped article described in item [18], which is a film showing homeotropic alignment.

[23] The liquid-crystal composition described in any one of items [8] to [15], which has a chiral nematic phase or a cholesteric phase.

[24] An optically-anisotropic shaped article showing a helical structure, which comprises a polymer obtained from the liquid-crystal composition described in item [23].

[25] The shaped article described in item [24], which selectively reflects a part or all of light falling within a region of a wavelength of 350 to 750 nm.

[26] The shaped article described in item [24], which reflects light falling within a region of a wavelength of 100 to 350 nm.

[27] The shaped article described in any one of items [24] to [26], wherein the helical pitch continuously varies in the direction of the thickness of the shaped article.

[28] An optically-compensatory device composed of the shaped article described in any one of items [24] to [27].

[29] A ¼ wavelength functional plate, wherein the shaped article described in any one of items [24] to [27] is used.

[30] A ½ wavelength functional plate, wherein the shaped article described in any one of items [24] to [27] is used.

[31] An optical device composed of a combination of the shaped article described in any one of items [24] to [27] and a polarizer.

[32] A liquid-crystal display device which contains the shaped article described in any one of items [24] to [27].

The compound and the composition containing the compound of the invention exhibit excellent polymerizability in air, and readily give a polymer having a high degree of polymerization through irradiation with light for a short period of time. The compound of the invention is free from polymerization interference even in UV polymerization in open air. The aligned film obtained by aligning and polymerizing the composition containing the compound of the invention has good adhesiveness to TAC.

DETAILED DESCRIPTION OF THE INVENTION

The words in the invention are defined as follows. The meaning of "liquid-crystalline" is not limited only to having a liquid-crystal phase. It is included in the meaning of the liquid crystalline that the compound itself does not have a liquid-crystal phase but has such characteristics that it can be used as a component of a liquid-crystal composition when it is mixed with any other liquid-crystal compound. "(Meth) acryloyloxy" means "acryloyloxy or methacryloyloxy". "(Meth)acrylate" means "acrylate or methacrylate". "(Meth) acrylic acid" means "acrylic acid or methacrylic acid". "Any other polymerizable compound" means a polymerizable compound differing from the compound of the invention.

The words "liquid-crystalline compound", "liquid-crystal composition" and "liquid-crystal device" may be expressed as "compound", "composition" and "device", respectively. Compounds represented by Formula (1a), Formula (1b), Formula (M1) and Formula (M2) may be expressed as compound (1a), compound (1b), compound (M1) and compound (M2), respectively. Compound (1a) and compound (1b) may be expressed as a generic term for them, compound (1).

The expression saying that any A may be replaced by B or C is meant to include a case where any A is replaced by B and at the same time any other of the remaining A is replaced by C, in addition to a case where any A is replaced by B and a case where any A is replaced by C. For example, a group derived from C$_4$H$_9$— by replacing any —CH$_2$— therein by —O— or —CH=CH— includes C$_3$H$_7$O—, CH$_3$—O—(CH$_2$)$_2$, CH$_3$—O—CH$_2$—O—, CH$_2$=CH—(CH$_2$)$_3$—, CH$_3$—CH=CH—(CH$_2$)$_2$, CH$_3$—CH=CH—CH$_2$—O—. In consideration of the stability of the compound, it is undesirable that continuing two (—CH$_2$—)'s in the compound are both replaced by —O— or —S—.

First, the compound of the invention is described.
The compound of the invention is represented by Formula (1a) or Formula (1b).

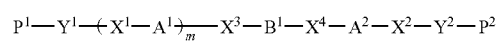

The compound (1) has the following characteristics.

(1) The compound (1) is a polymerizable liquid-crystal compound having at least one hydroxyl group (—OH) in the side chain of the molecule thereof.

(2) The compound (1) is physically and chemically stable in the extreme under ordinary service condition, and is highly compatible with any other compound.

(3) The physical properties of the compound (1) can be controlled by suitably selecting the ring, the bonding group and the side chain that constitute the compound (1), so that the compound (1) may have a high dielectric anisotropy, a low dielectric anisotropy, a high optical anisotropy, a low optical anisotropy or a low viscosity.

In Formula (1a) and Formula (1b), $R^1$ is hydrogen, fluorine, chlorine, —CN, —NCO, —NCS, —CF$_3$, —OCF$_3$, —OCHF$_2$, or alkyl having 1 to 20 carbon atoms. In the alkyl, any —CH$_2$— may be replaced by —O—, —S—, —COO—, —OCO—, —CO—, —CH=CH— or —C≡C—, any hydrogen may be replaced by halogen, —CN or —CH$_3$. Preferably, the terminal —CH$_2$— is not replaced by —O—, —S—, —COO—, —OCO— or —CO—. When $R^1$ is alkyl having 1 to 20 carbon atoms and when any hydrogen in the alkyl is replaced by halogen, —CN or —CH$_3$, then $R^1$ may be an optically-active group.

Preferred examples of $R^1$ are alkyl or alkoxy having 1 to 10 carbon atoms. Their specific examples are methyl, ethyl, propyl, butyl, pentyl, hexyl, heptyl, octyl, nonyl, decyl, methoxy, ethoxy, propyloxy, butyloxy, pentyloxy, hexyloxy, heptyloxy, octyloxy, nonyloxy and decyloxy. Depending on the length of the alkyl, the temperature range for the liquid-crystal phase of the compound may be controlled. In the alkyl or alkoxy, any hydrogen may be replaced by fluorine, chlorine, —CN or —CH$_3$. When $R^1$ is alkyl or alkoxy and when any hydrogen therein is replaced by fluorine or chlorine, then the melting point of the compound (1) could be lowered. When $R^1$ is an optically-active group, its preferred examples are 2-methylbutyl, 1-methylbutyl, 1-methylpropyl, 1-methylpentyl, 1-methylheptyl, 1-methyloctyl, 2-chlorooctyl, 2-fluorooctyl and 2-cyanooctyl. The compound (1) having such $R^1$ may impart a helical twisting power to a liquid-crystal composition.

In Formulae (1a) and (1b), $Y^1$ and $Y^2$ are a boding group. $Y^1$ and $Y^2$ are independently alkylene having 1 to 15 carbon atoms, any —CH$_2$— in the alkylene may be replaced by —O—, —S—, —COO—, —OCO— or —CO—, and any hydrogen therein may be replaced by halogen, —CN or —CH$_3$. When any hydrogen in the alkylene is replaced by halogen, —CN or —CH$_3$, then $Y^1$ or $Y^2$ may be an optically-active group.

A preferred example of $Y^1$ or $Y^2$ is alkylene having 1 to 12 carbon atoms, and any —CH$_2$— in the alkylene may be replaced by —O—, —COO—, —OCO— or —CO—. A more preferred example of $Y^1$ or $Y^2$ is alkylene having 1 to 10 carbon atoms, and any —CH$_2$— in the alkylene may be replaced by —O—, —COO— or —OCO—.

In Formulae (1a) and (1b), $A^1$ and $A^2$ are a divalent group having a cyclic structure. $A^1$ and $A^2$ are independently 1,4-cyclohexylene, 1,4-cyclohexenylene, 1,4-phenylene, pyridine-2,5-diyl, pyridazine-3,6-diyl, pyrimidine-2,5-diyl, naphthalene-2,6-diyl, tetrahydronaphthalene-2,6-diyl, biphenyl-4,4'-diyl, 1,3-dioxane-2,5-diyl, 1,4-cyclohexylene in which at least one hydrogen is replaced by fluorine, or 1,4-phenylene in which at least one hydrogen is replaced by halogen, —CN, —CH$_3$, —CH$_2$CH$_3$, —OCH$_3$, —OH, —CHO, —OCOCH$_3$, —COCH$_3$, —COCF$_3$, —CF$_3$ or —CF$_2$H. Preferred examples of $A^1$ and $A^2$ are shown below.

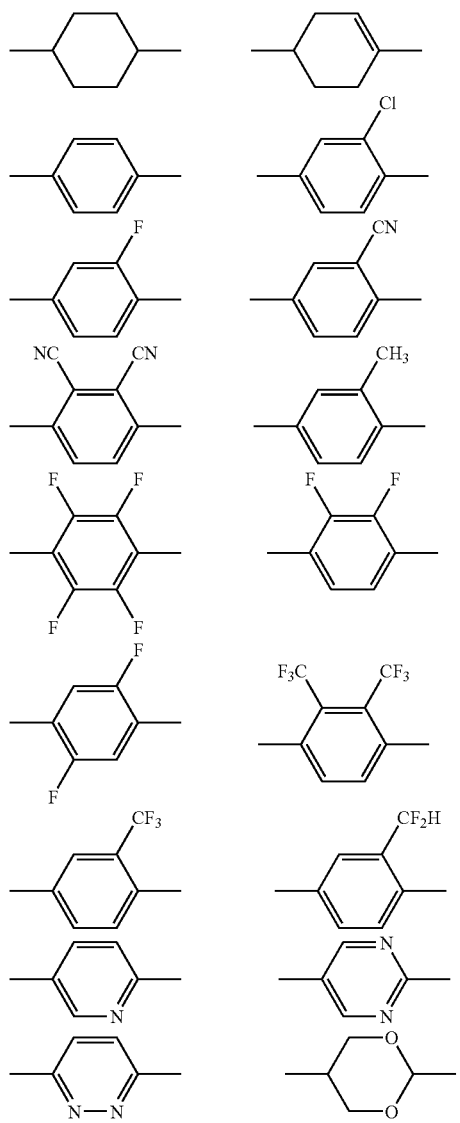

In Formula (1a) and Formula (1b), $B^1$ is a divalent group having a cyclic structure. $B^1$ is 1,4-cyclohexylene, 1,4-phenylene, naphthalene-2,6-diyl, tetrahydronaphthalene-2,6-diyl, biphenyl-4,4'-diyl, fluorene-2,7-diyl, 9-methylfluorene-2,7-diyl, 9-ethylfluorene-2,7-diyl, 9,9-dimethylfluorene-2,7-diyl, 9-chlorofluorene-2,7-diyl, 9,9-difluorofluorene-2,7-diyl, anthracene-2,7-diyl, anthracene-5,10-diyl, phenanthrene-2,7-diyl, pentacene-2,8-diyl, pyridazine-3,6-diyl, 1,4-phenylene in which at least one hydrogen is replaced by halogen, —CH$_3$, —CH$_2$CH$_3$, —OCH$_3$, —OCH$_2$CH$_3$, —CN, —COCH$_3$, —OCOCH$_3$, —CHO, —OH, —COCF$_3$, —CF$_3$, phenyl or toluyl, or a group represented by any one of Formula (K1) to Formula (K3):

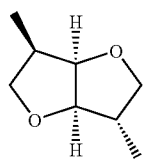 (K1)

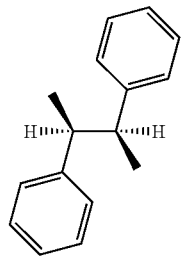 (K2)

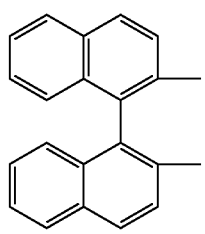 (K3)

Preferred examples of $B^1$ are shown below.

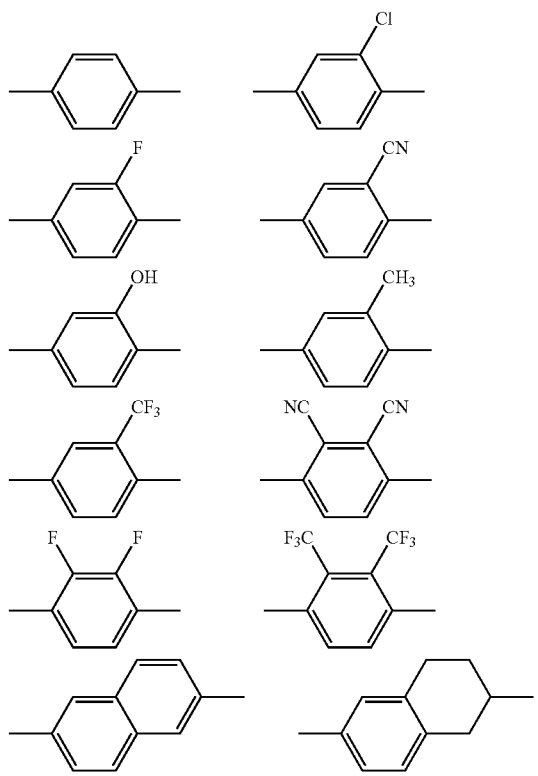

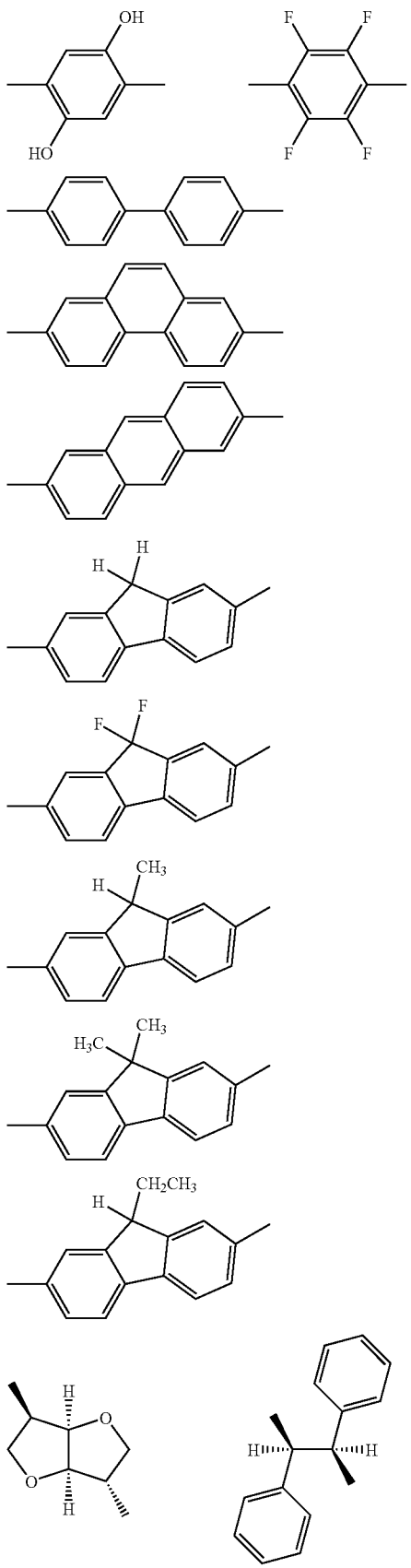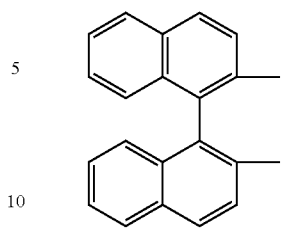

The bonding direction of these cyclic structures in each of Formula (1a) and Formula (1b) may be the right-to-left opposite direction. When the compound (1) has 1,4-cyclohexylene or 1,3-dioxane-2,5-diyl, its steric configuration is preferably a trans-form rather than a cis-form. The compound (1) may contain a larger amount of isotope elements such as $^2$H (deuterium) or $^{13}$C than in naturally-existing compounds, and it has no significant difference on the physical properties of the compound.

In Formulae (1a) and (1b), $X^1$, $X^2$, $X^3$ and $X^4$ are a bonding group. $X^1$ and $X^2$ are independently a single bond, —O—, —S—, —COO— or —OCO—. Preferred examples of $X^1$ and $X^2$ are a single bond and —O—. $X^3$ and $X^4$ are independently a single bond, —COO—, —OCO—, —OCH$_2$—, —CH$_2$O—, —OCF$_2$—, —CF$_2$O—, —CH$_2$CH$_2$—, —CH=CH—COO— or —C≡C—. Preferred examples of $X^3$ and $X^4$ are —COO—, —OCO— and —C≡C—. When at least one of $X^3$ and $X^4$ is —COO— or —OCO—, then the temperature range of the liquid-crystal phase may be broad; and when —C≡C—, then the compound may have a large value of optical anisotropy.

In Formulae (1a) and (1b), m is 0, 1 or 2. When m is 2, then two $X^1$'s and two $A^1$'s both may be the same group or different groups. Preferably, m is 0 or 1.

In Formulae (1a) and (1b), $P^1$ and $P^2$ are independently a group represented by any one of Formula (P1) to Formula (P4). These are a group having an addition-polymerizable functional group, and a group represented by Formula (P1) is especially preferred since the compound of the type may be readily polymerized through exposure to UV rays.

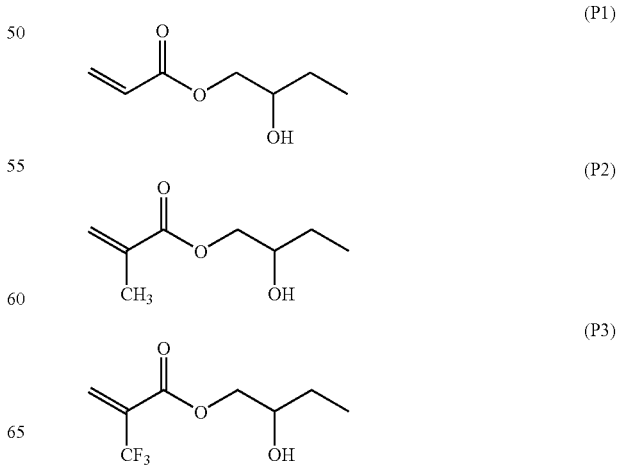

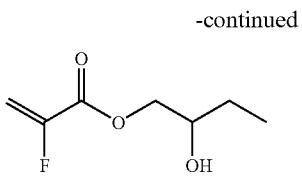
(P4)

The compound (1) with desired properties can be obtained by appropriately selecting the above-mentioned ring, side-chain, bond and polymerizable group.

Methods for producing the compound (1) are described. The compound (1a) may be produced from a monofunctional liquid-crystalline epoxy compound (EP1). The compound (1b) may be produced from a bifunctional liquid-crystalline epoxy compound (EP2). The compound (EP1) and the compound (EP2) may be readily produced with reference to known methods (e.g., Non-Patent References a to c, and Patent References a to e).

Non-Patent Reference a: Macromol. Chem. Phys., 1995, 196, 3391

Non-Patent Reference b: Macromolecules, 1993, 26, 1244.

Non-Patent Reference c: Polymer, 1994, Vol. 35, Number 3, 622

Patent Reference a: JP-A 7-258638

Patent Reference b: WO 95-07308

Patent Reference c: WO 97-34862

Patent Reference d: DE 19640619

Patent Reference e: GB 2338240

The compound (1a) or the compound (1b) may be produced by reacting a compound (EP1) or a compound (EP2) with an acrylic acid derivative (Ac1) such as acrylic acid, methacrylic acid, trifluoromethacrylic acid or α-fluoroacrylic acid. The reaction is attained at a temperature falling between 50 and 150° C. for 1 to 8 hours or so. For the reaction, a catalyst is preferably used. The catalyst includes amines such as triethylamine, dimethylbutylamine and tri-n-butylamine; quaternary ammonium salts such as tetramethylammonium salts, tetraethylammonium salts, tetrabutylammonium salts and benzyltriethylammonium salts; quaternary phosphonium salts; phosphines such as triphenyl phosphine; imidazoles such as 2-methylimidazole and 2-methyl-4-methylimidazole; alkaline earth metal salts such as magnesium hydroxide, magnesium acetate, magnesium (meth)acrylate, magnesium chloride, zinc hydroxide, zinc acetate, zinc (meth)acrylate and zinc chloride; and alkaline earth metal oxides such as magnesium oxide and zinc oxide. One or more of these may be used herein either singly or as combined.

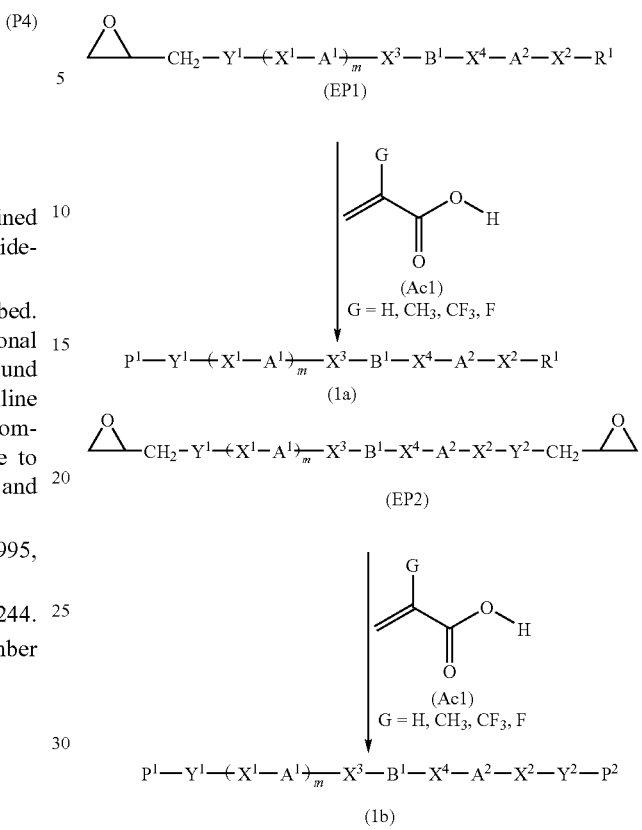

The reaction may be carried out in the absence or presence of a solvent. Examples of the solvent are benzene, toluene, xylene, n-hexane, n-heptane, n-octane, cyclohexane, acetone, 2-butanone, methyl isobutyl ketone, dipropyl ether, dipropylene glycol diethyl ether, ethyl acetate and butyl acetate. Preferably, the reaction is carried out in the presence of a polymerization inhibitor for preventing the polymerization of the compound (1a) or the compound (1b) formed. For further enhancing the polymerization inhibiting effect, it is desirable that a mixed gas of air or oxygen and argon is introduced into the reaction solution. Examples of the polymerization inhibitor are hydroquinone, p-methoxyphenol, 2,4-dimethyl-t-butylphenol, 3-hydroxythiophenol, p-benzoquinone, 2,5-dihydroxy-p-benzoquinone, t-butylcatechol, diphenylenediamine, phenyl-α-naphthylamine, diethanolamine, triethanolamine, phenothiazine, copper powder, copper dithiocarbamate, cupper oxide, cuprous chloride, copper sulfate, sulfur and ferric chloride. One or more these compounds may be used herein either singly or as combined.

Specific examples of the compound (1) are shown below.

No. 1

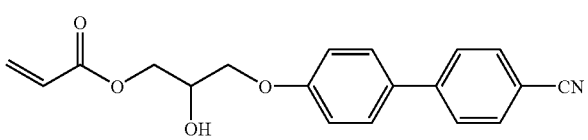

-continued
No. 2
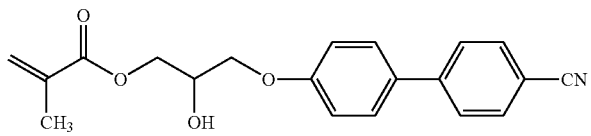
No. 3
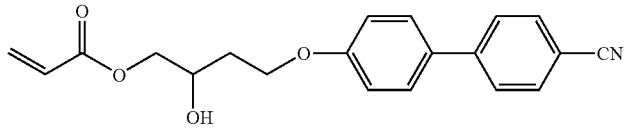
no. 4
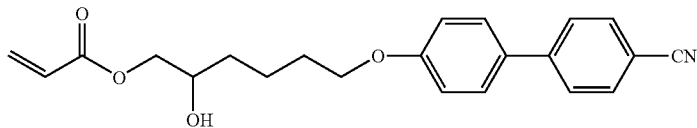
No. 5
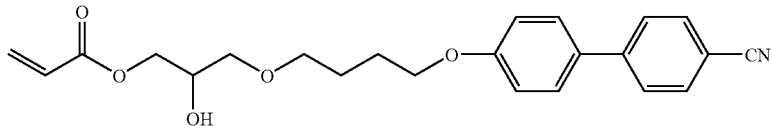
No. 6
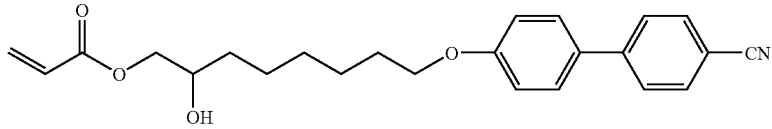
No. 7
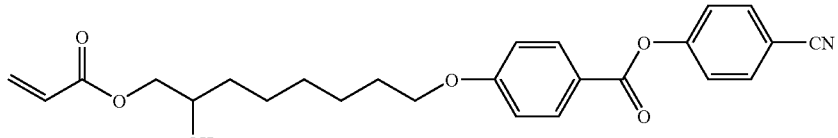
No. 8
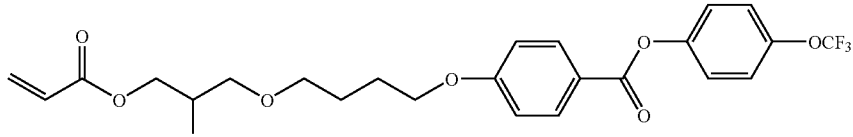
No. 9
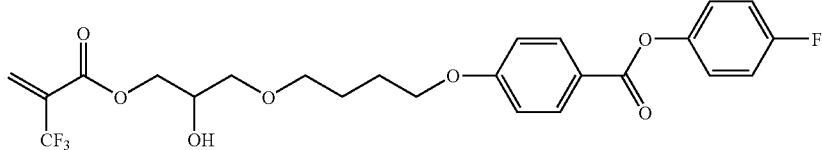
No. 10
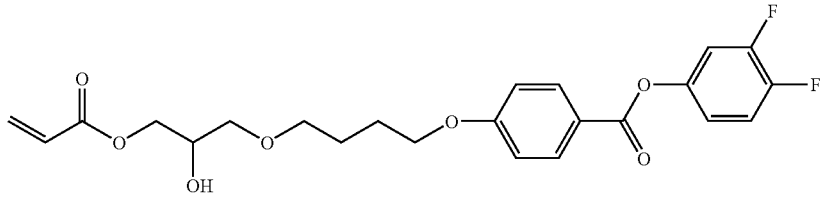
No. 11
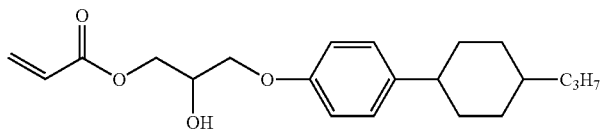

-continued
No. 12
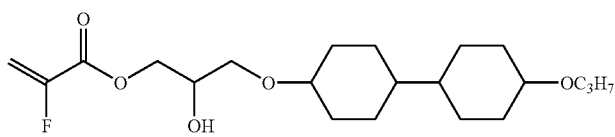
No. 13
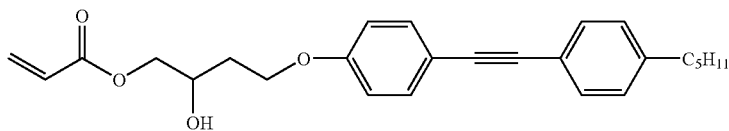
No. 14
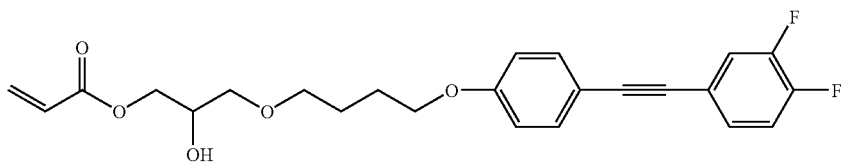
No. 15
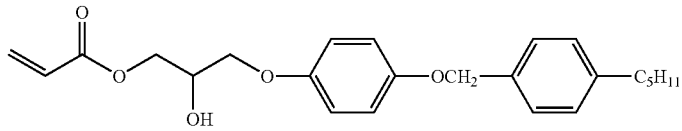
No. 16
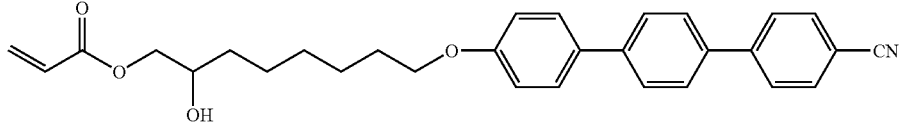
No. 17
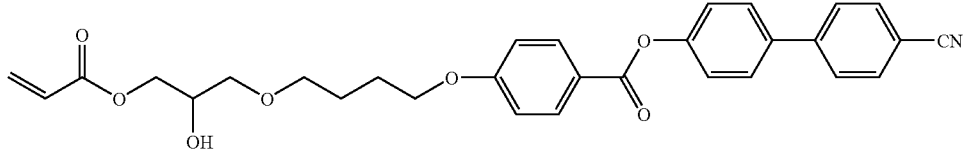
No. 18
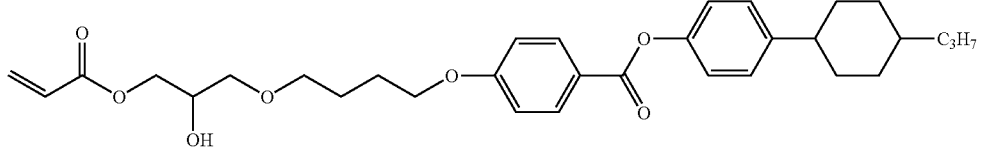
No. 19
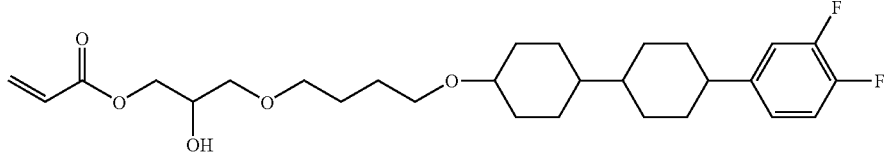
No. 20
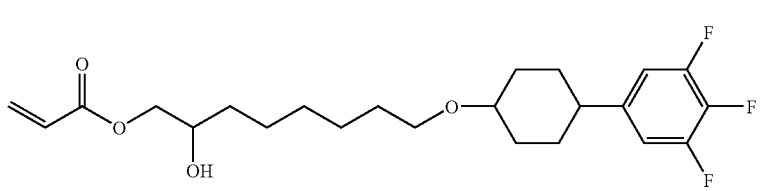
No. 21
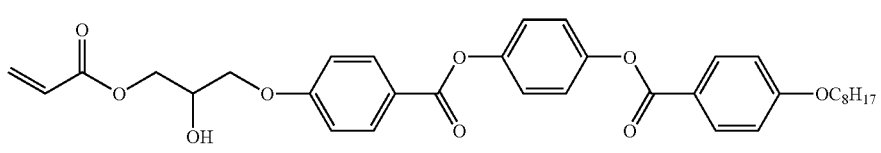

-continued
No. 22
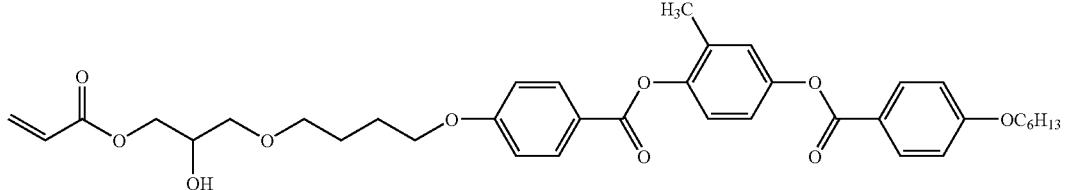
No. 23
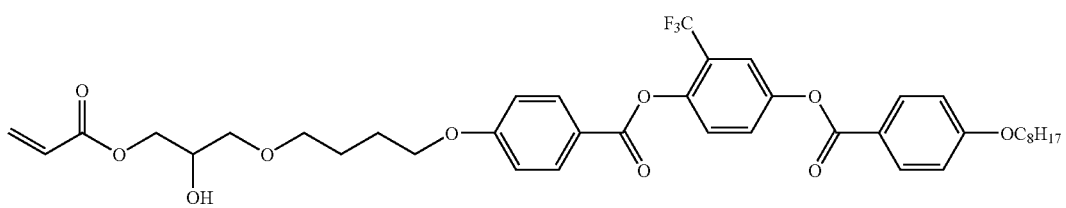
No. 24
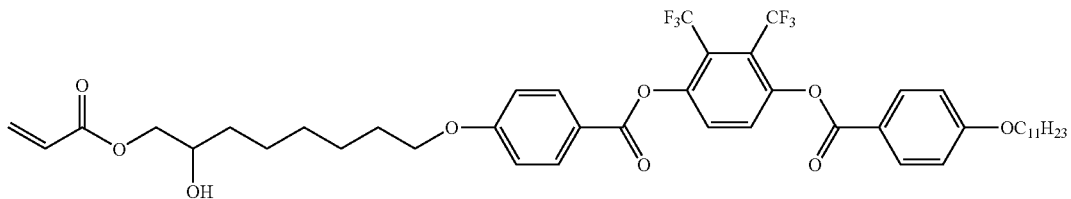
No. 25
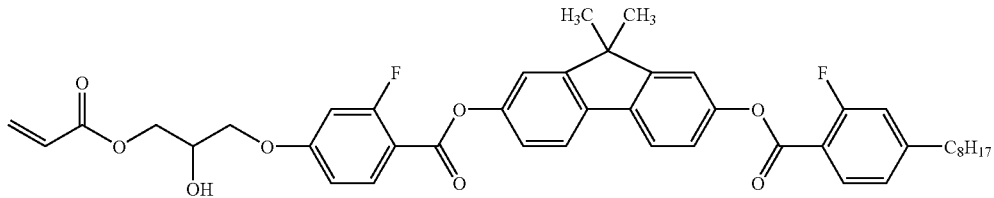
No. 26
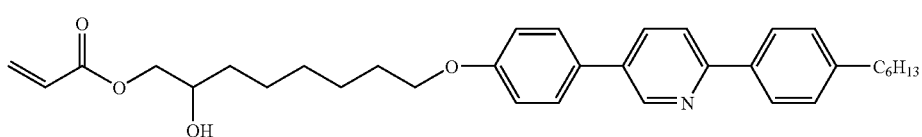
No. 27
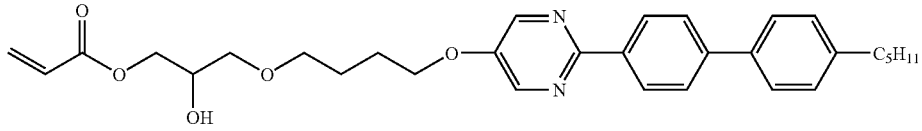
No. 28
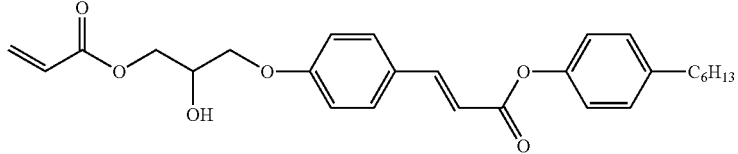
No. 29
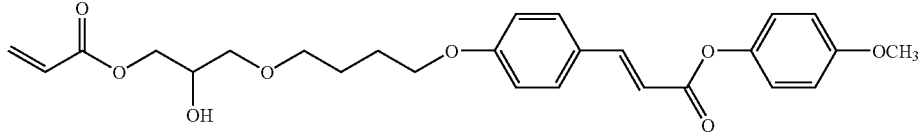
No. 30
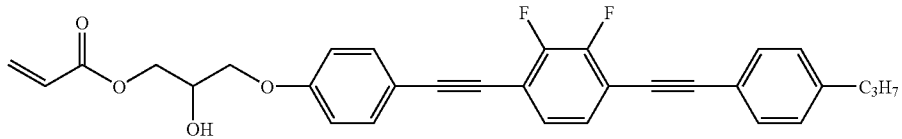

-continued
No. 31
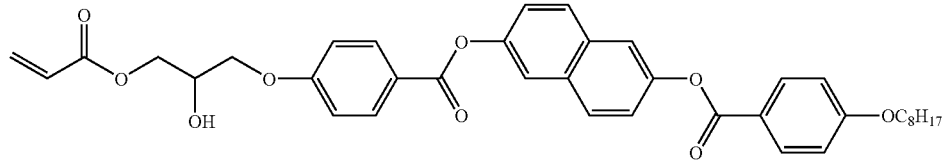
No. 32
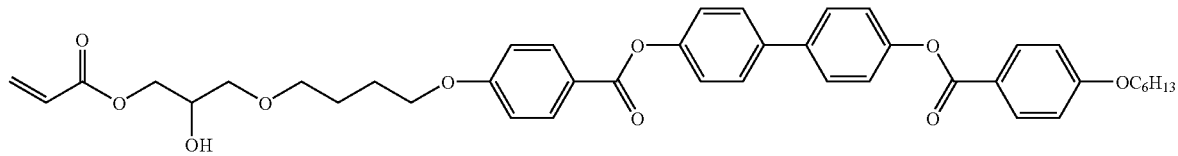
No. 33
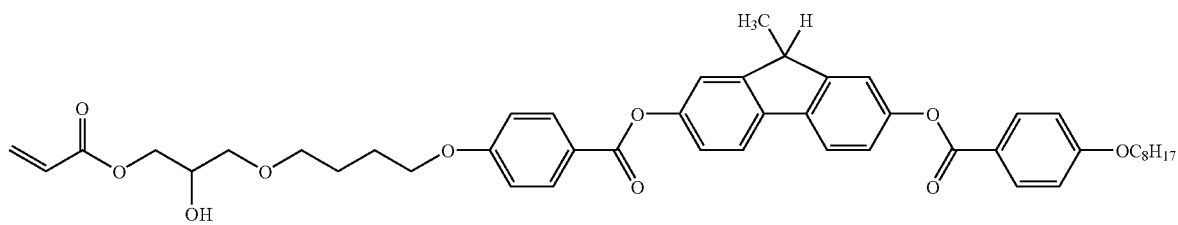
No. 34
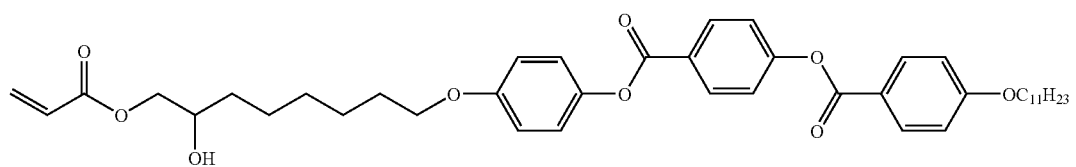
No. 35
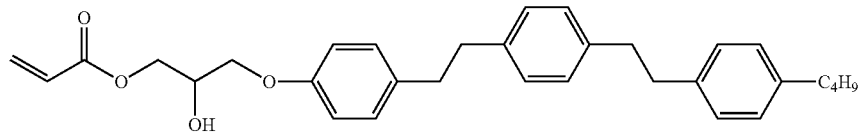
No. 36
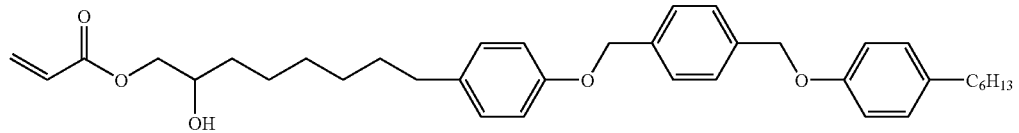
No. 37
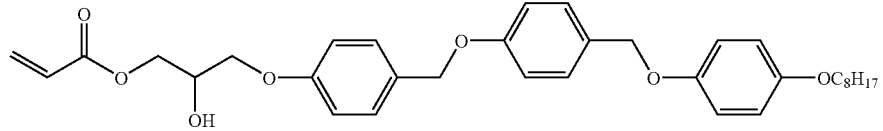
No. 38
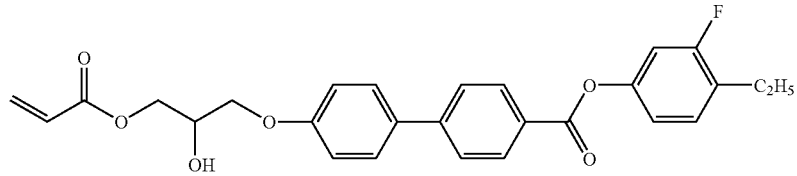
No. 39
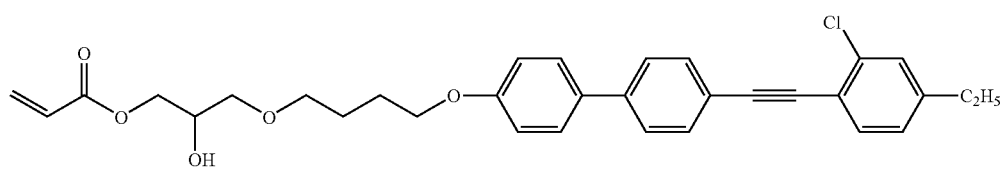

-continued
No. 40
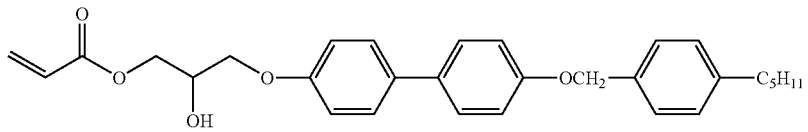
No. 41
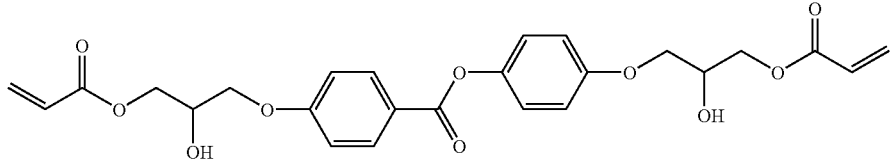
No. 42
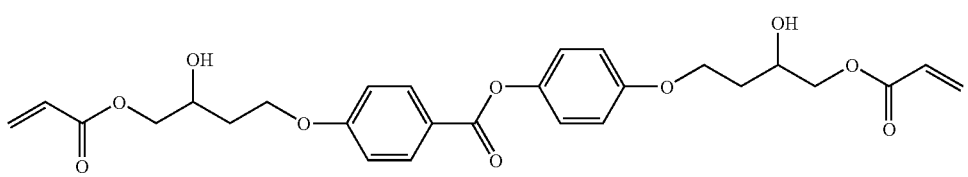
No. 43
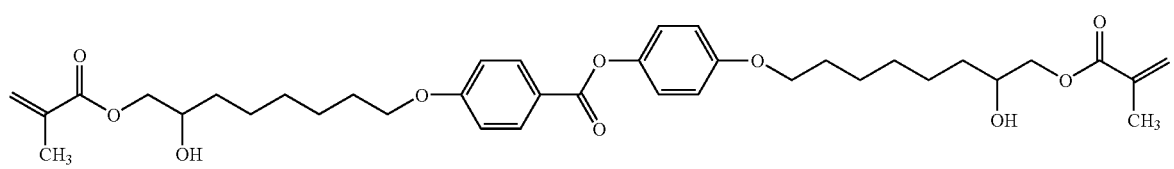
No. 44
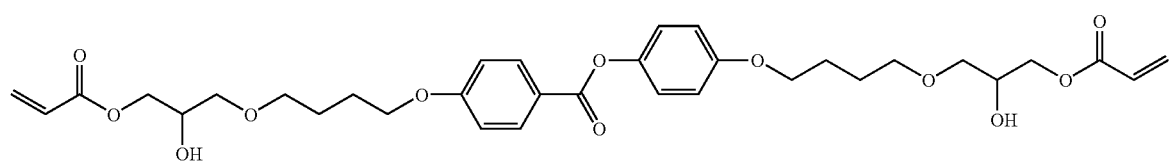
No. 45
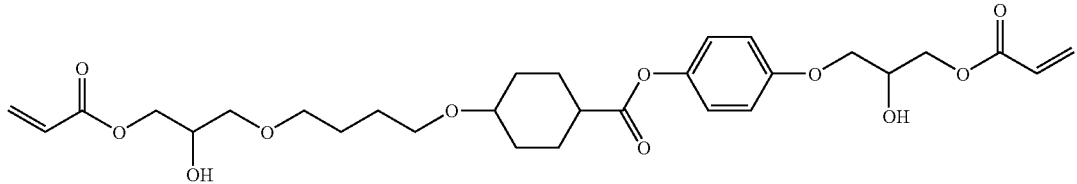
No. 46
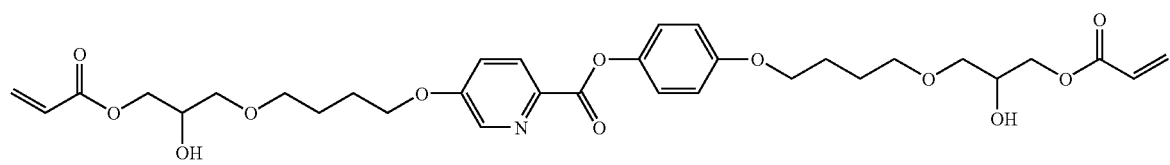
No. 47
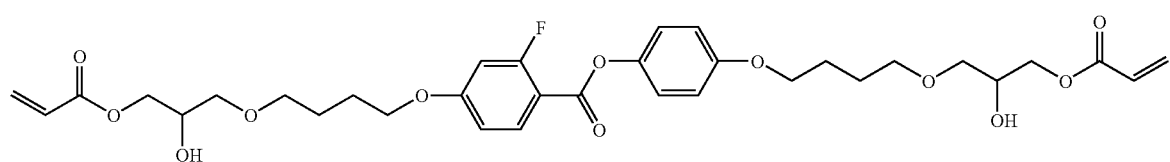

-continued
No. 48
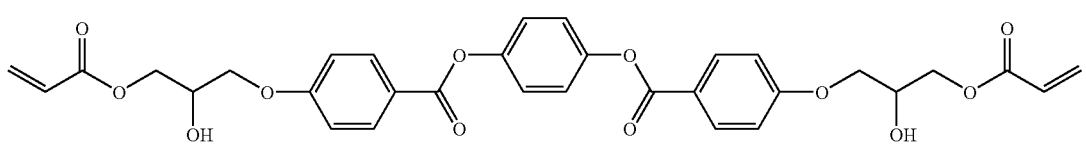
No. 49
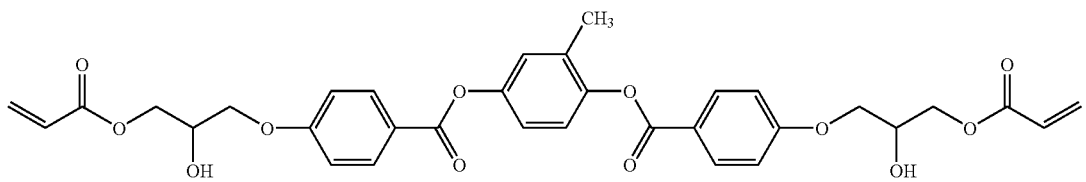
No. 50
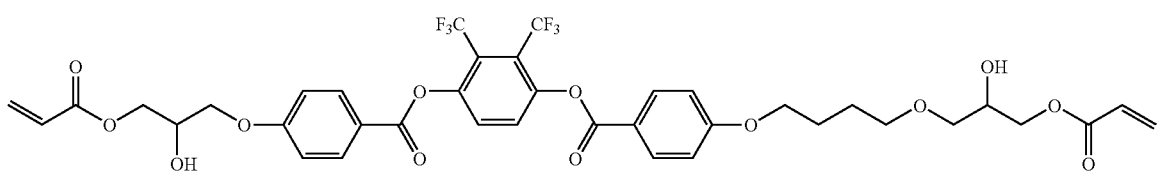
No. 51
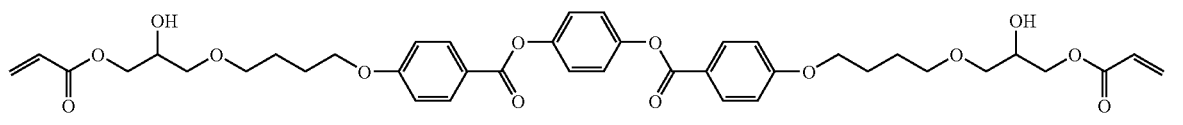
No. 52
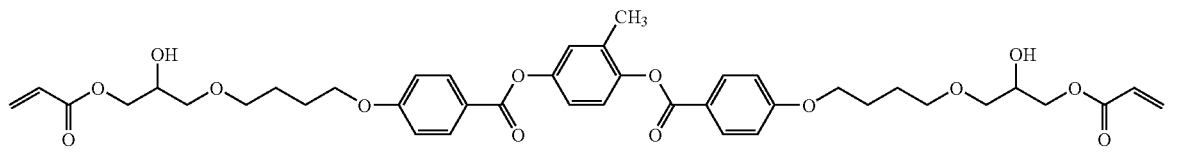
No. 53
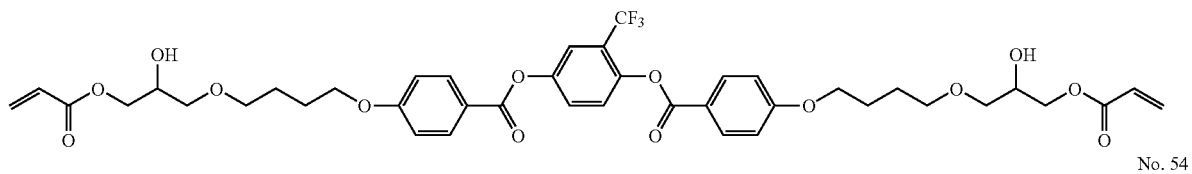
No. 54
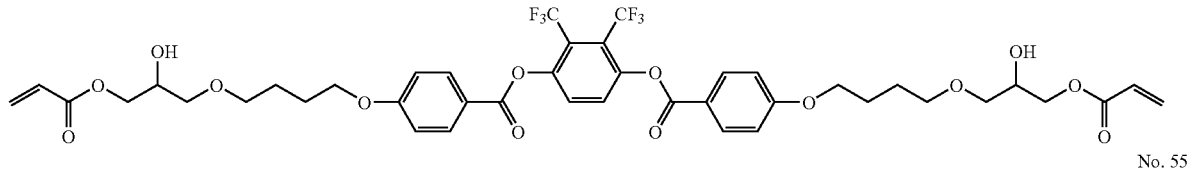
No. 55
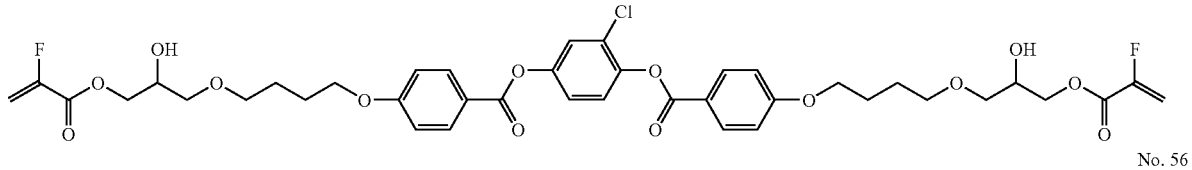
No. 56
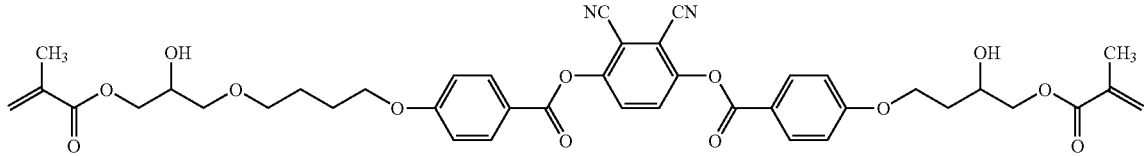

-continued
No. 57
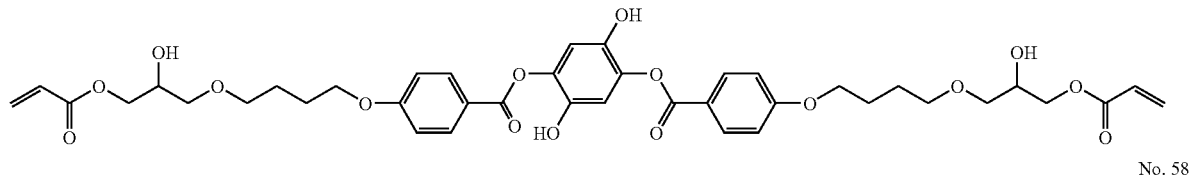
No. 58
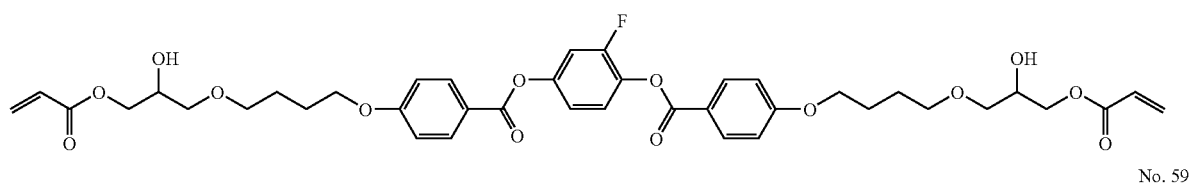
No. 59
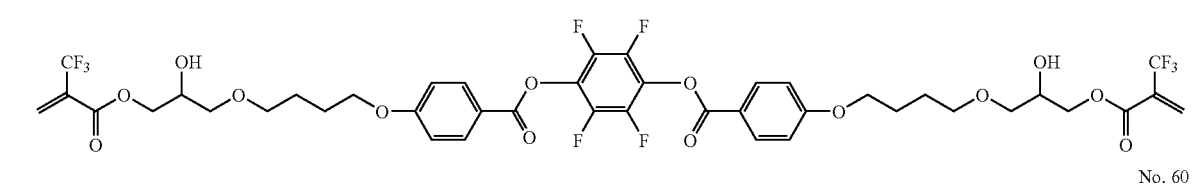
No. 60
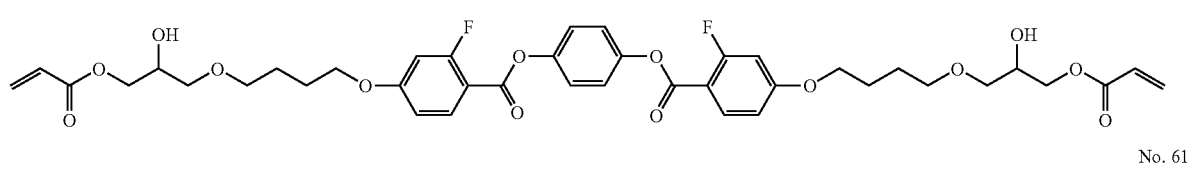
No. 61
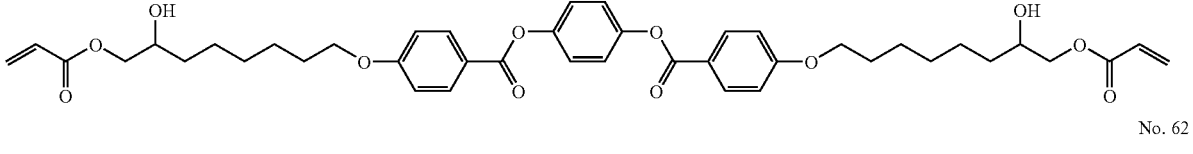
No. 62
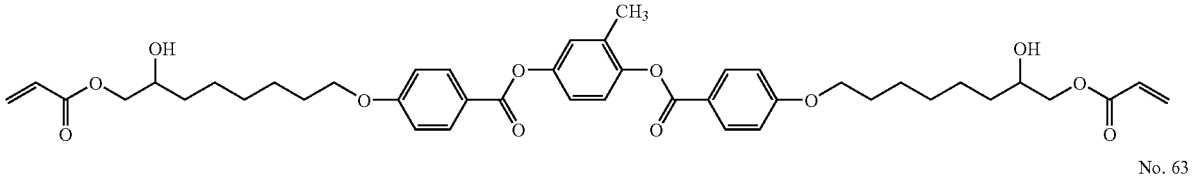
No. 63
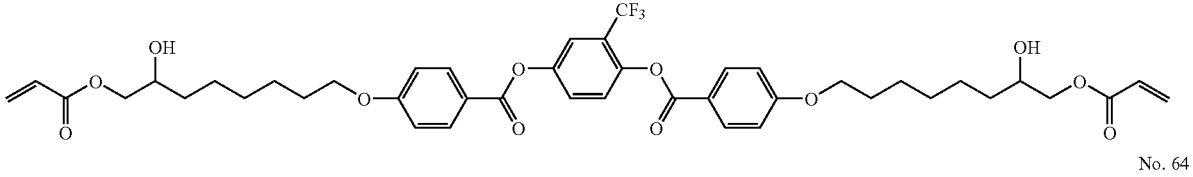
No. 64
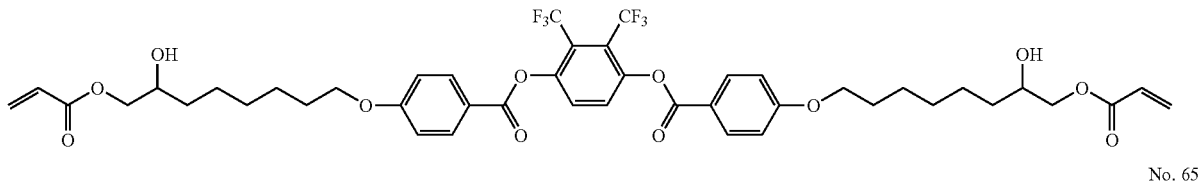
No. 65
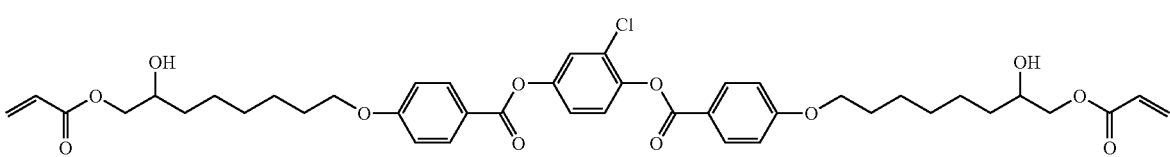

-continued
No. 66
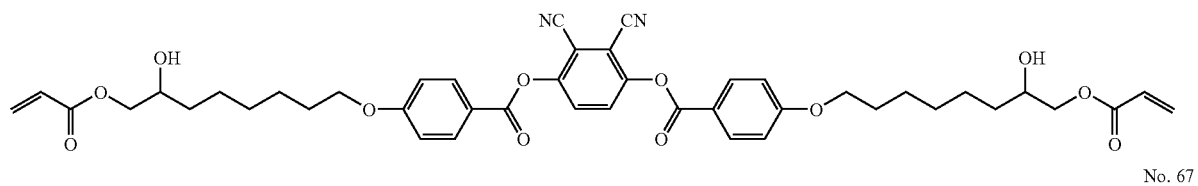
No. 67
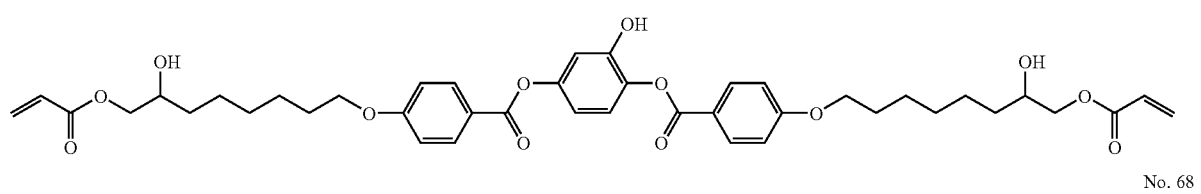
No. 68
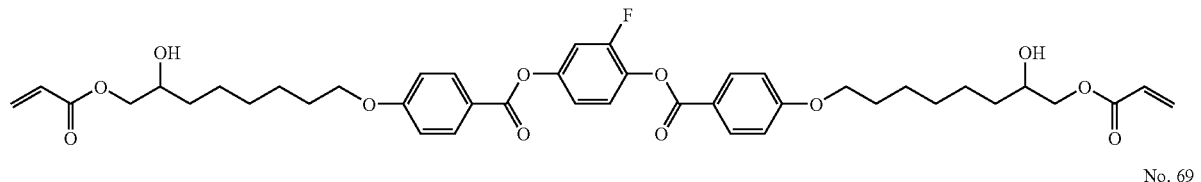
No. 69
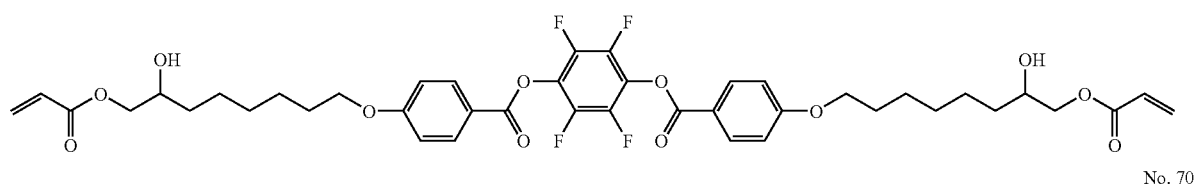
No. 70
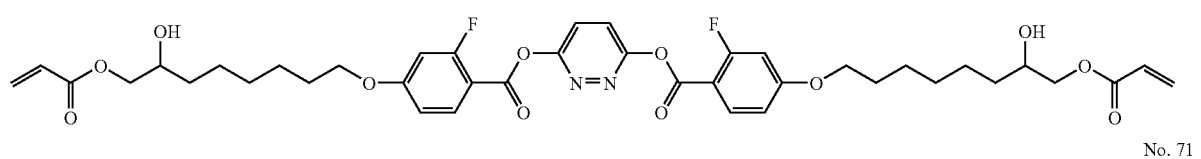
No. 71
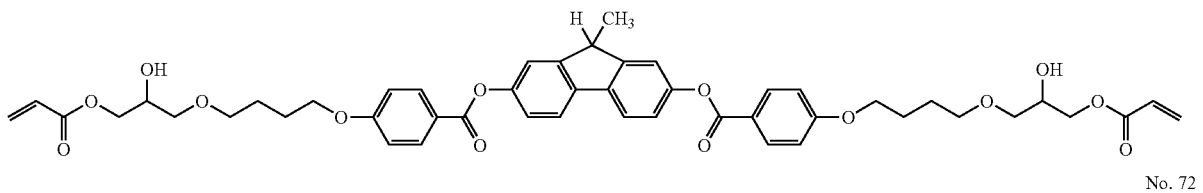
No. 72
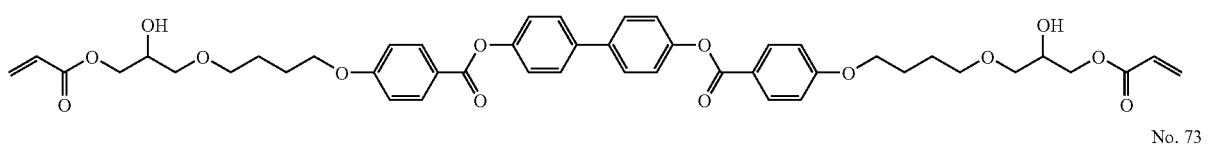
No. 73
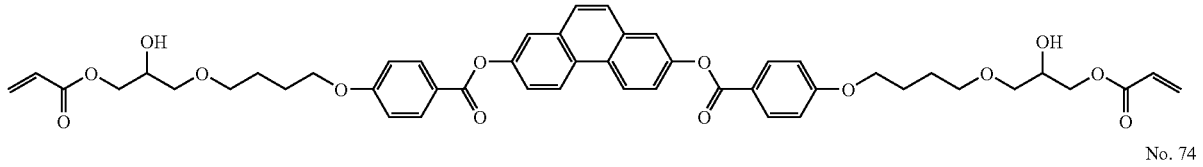
No. 74
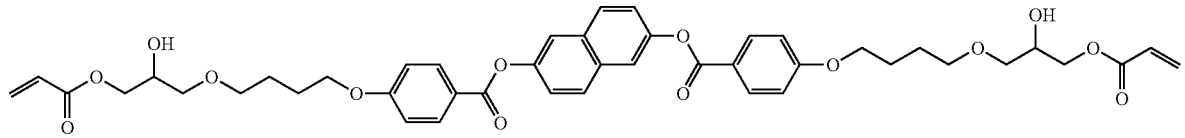

-continued
No. 75
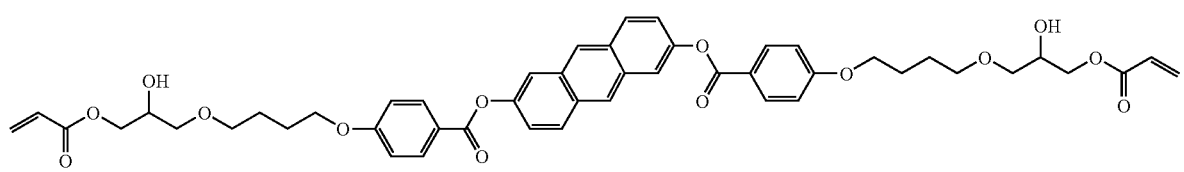
No. 76
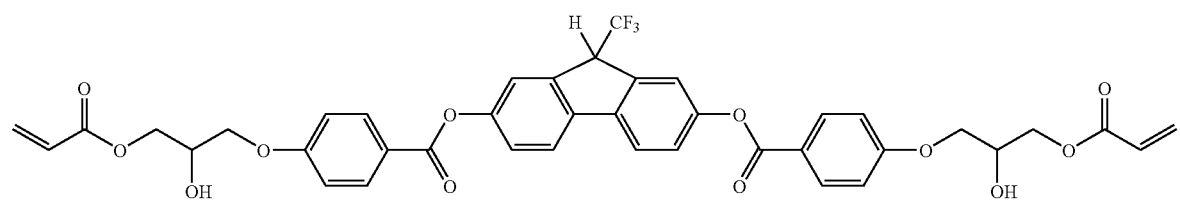
No. 77
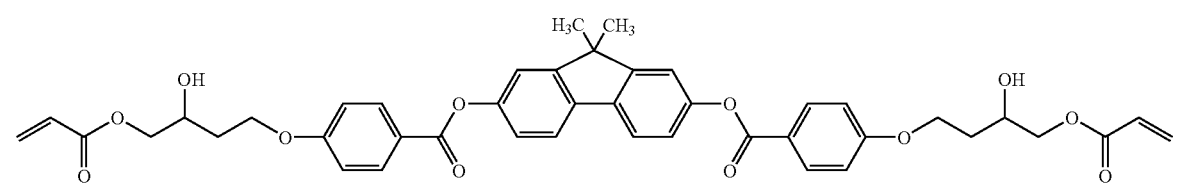
No. 78
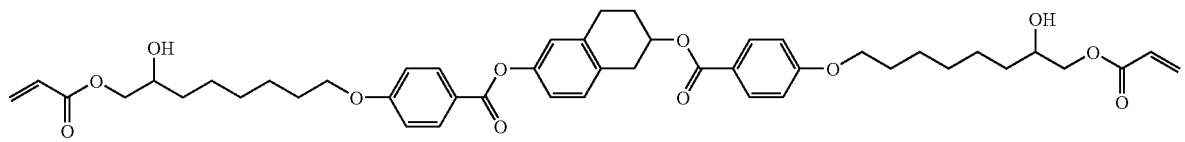
No. 79
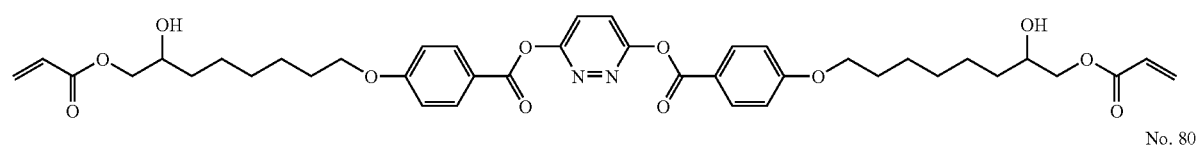
No. 80
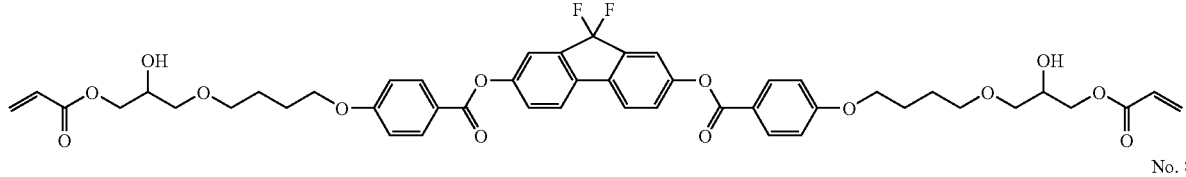
No. 81
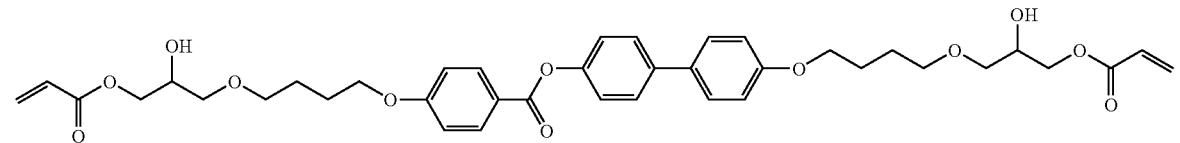
No. 82
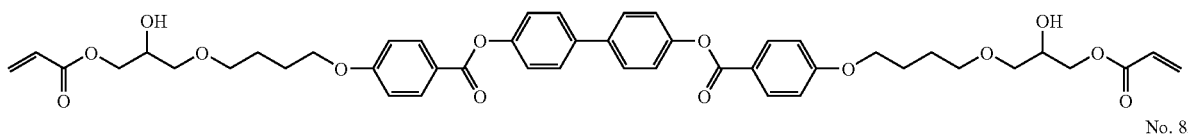
No. 83
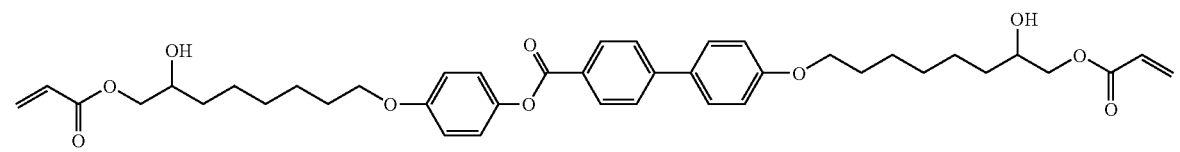

-continued
No. 84
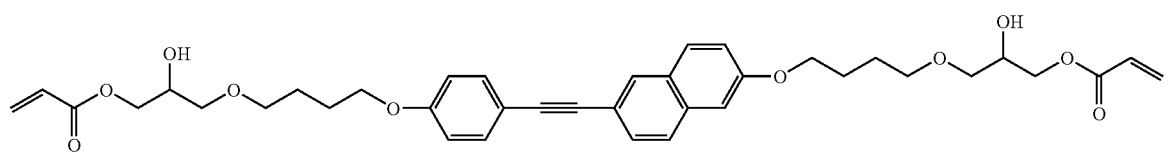
No. 85
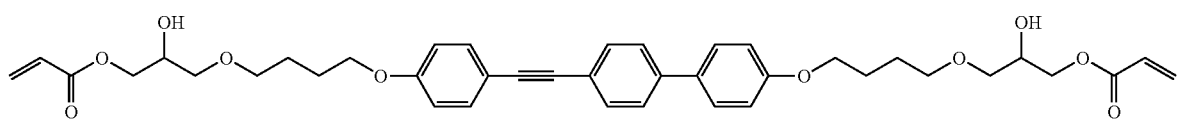
No. 86
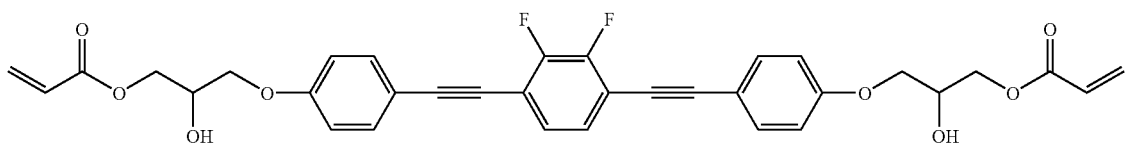
No. 87
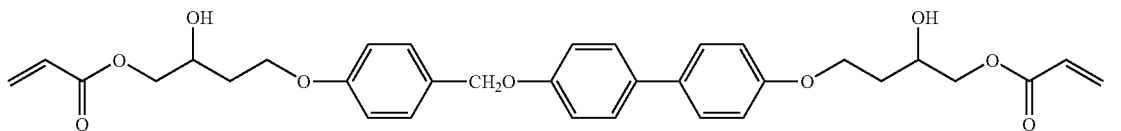
No. 88
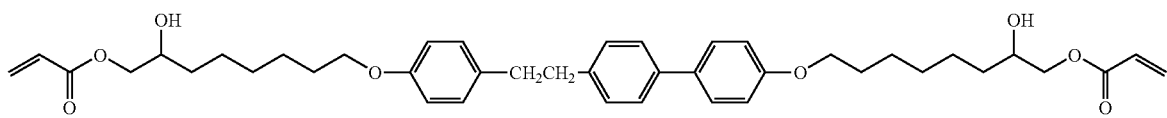
No. 89
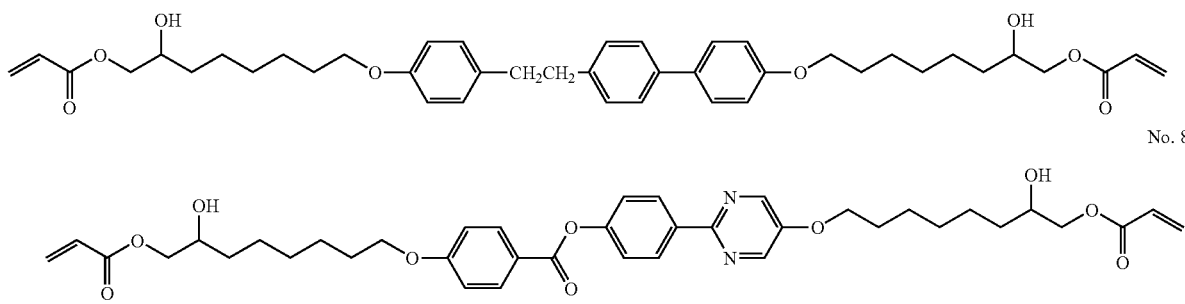
No. 90
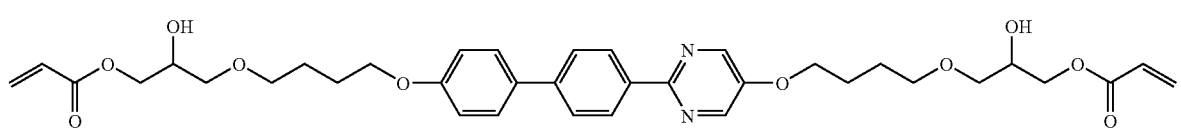
No. 91
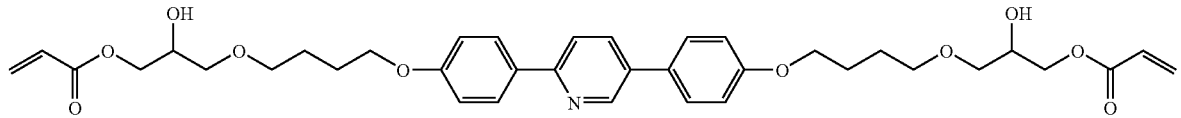
No. 92
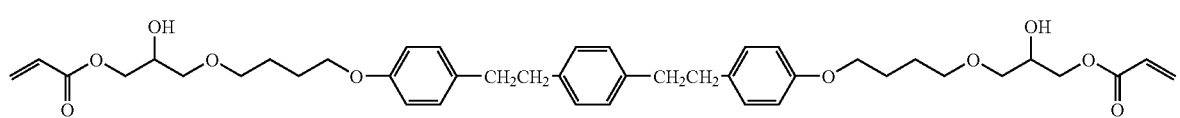
No. 93
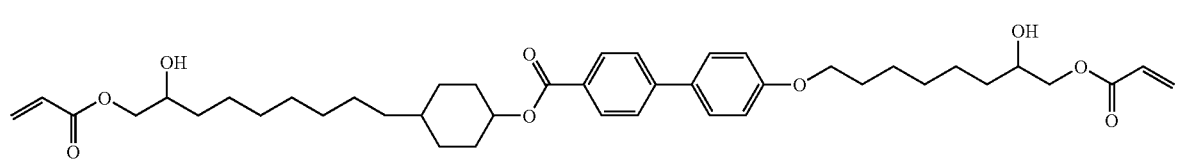

-continued
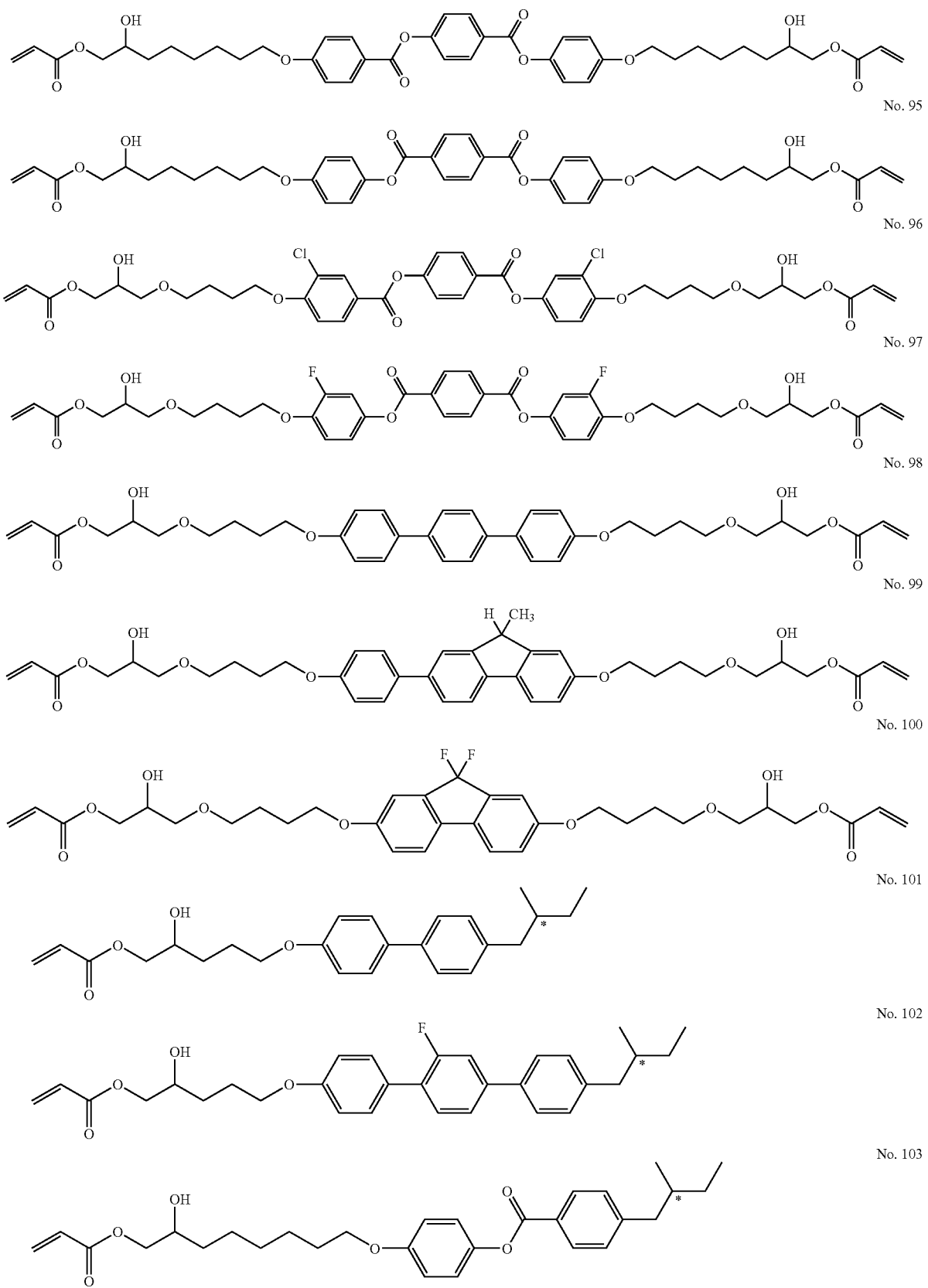

-continued
No. 104
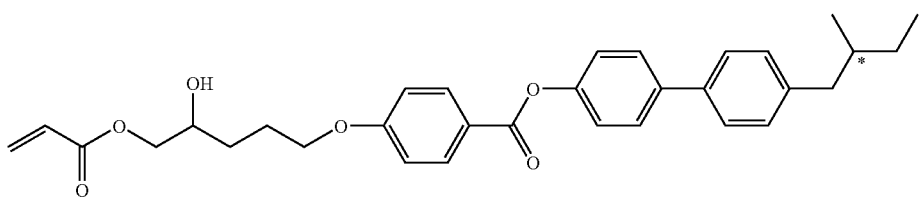
No. 105
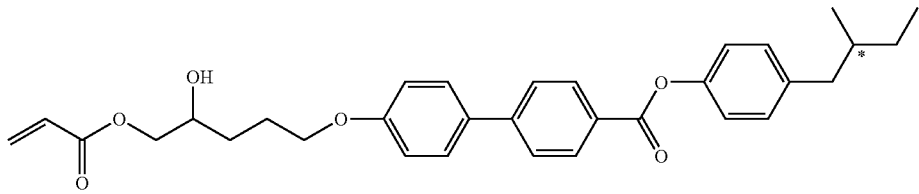
No. 106
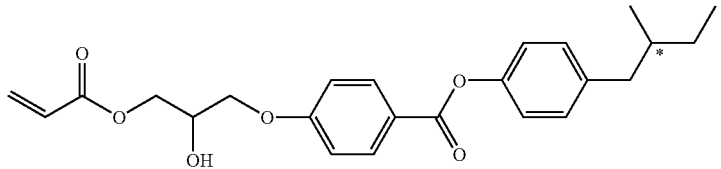
No. 107
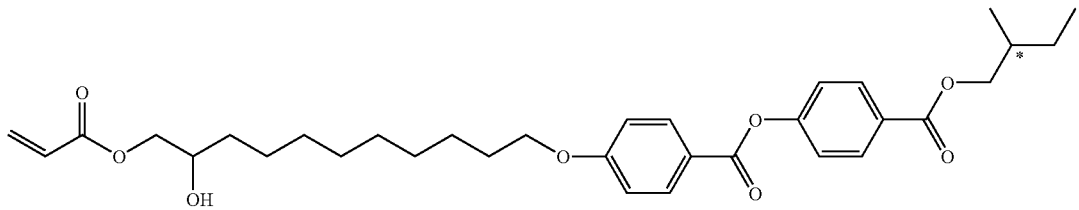
No. 108
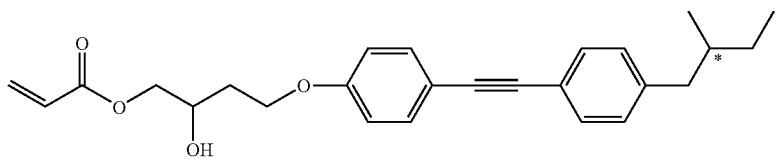
No. 109
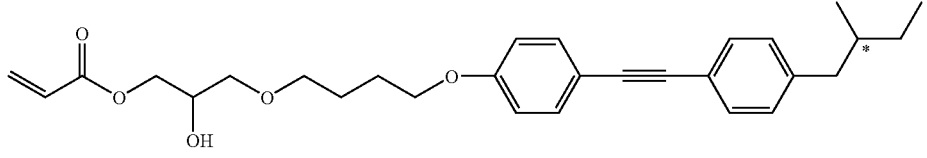
No. 110
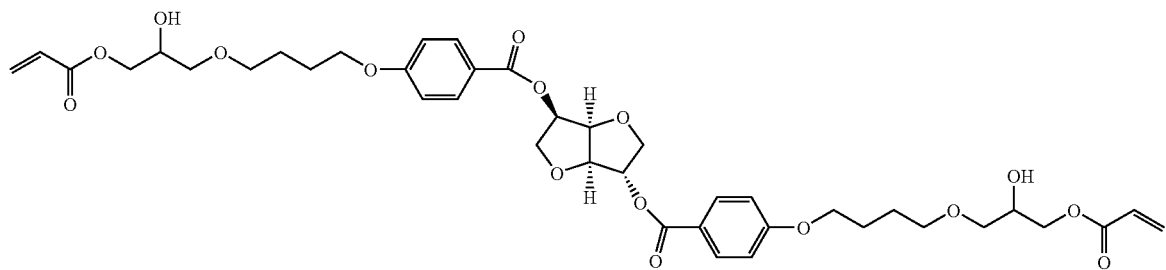

-continued
No. 111
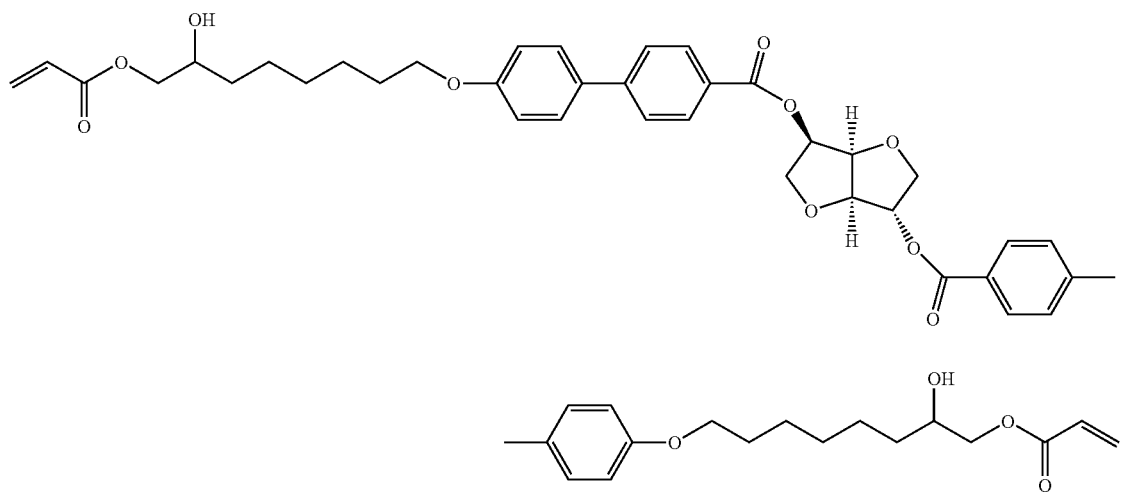
No. 112
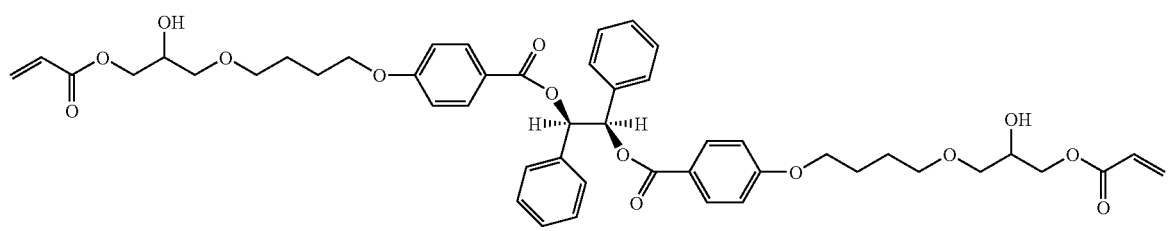
No. 113
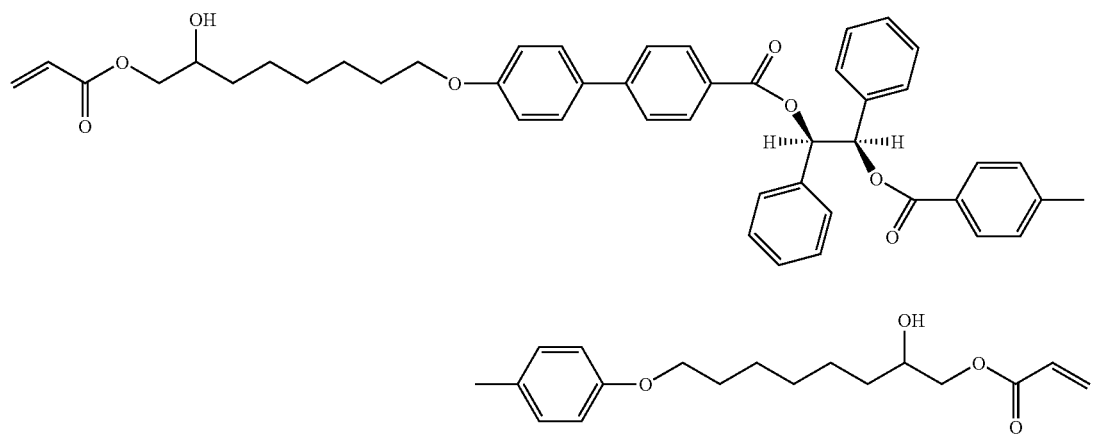
No. 114
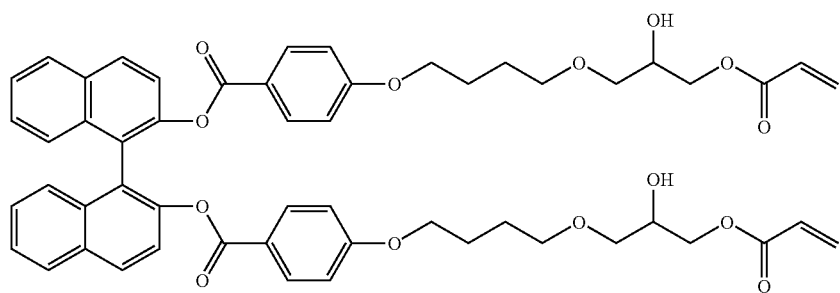

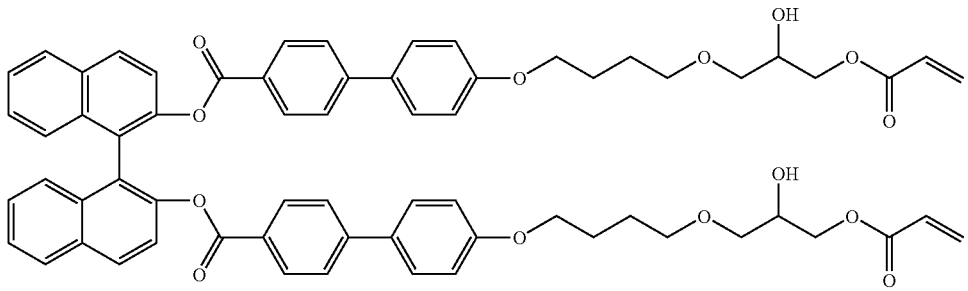

No. 115

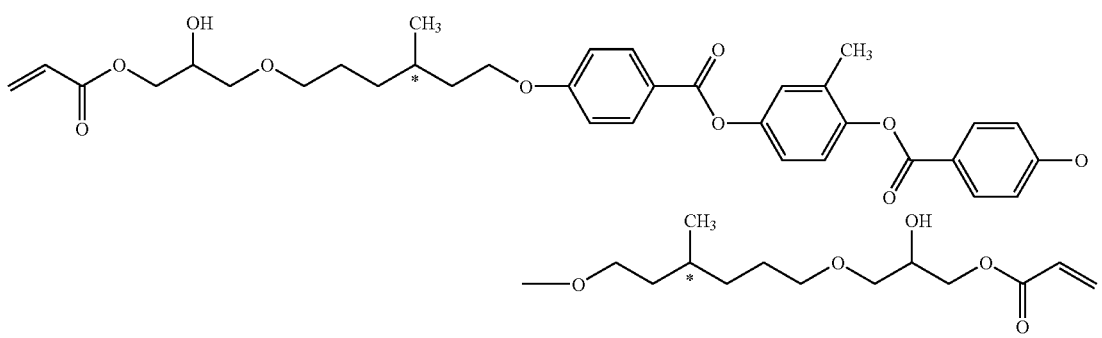

No. 116

The liquid-crystal composition of the invention comprises at least two compounds, containing at least one compound (1). The liquid-crystal composition of the invention has the following characteristics.

(1) When a polymerization initiator is added thereto, it may be rapidly polymerized through irradiation with electron rays such as UV rays.
(2) It may be polymerized in open air.
(3) Its alignability is good.
(4) Its compatibility with any other polymerizable liquid-crystal compound is good.

Preferably, all the constitutive components of the liquid-crystal composition of the invention are polymerizable compounds. In this case, all the components may be the compounds (1), or may be the compound (1) and any other polymerizable compound combined. The other polymerizable compound means a polymerizable compound that differs from the polymerizable liquid-crystal compound of the invention, as so mentioned hereinabove. Preferred examples of the other polymerizable compound are polymerizable compounds selected from a group of the compounds represented by Formula (M1) and Formula (M2):

wherein $R^5$ is hydrogen, fluorine, chlorine, —CN, or alkyl having 1 to 20 carbon atoms, any —CH$_2$— in the alkyl may be replaced by —O—, —S—, —COO—, —OCO— or —CO— and any hydrogen may be replaced by halogen; $A^3$, $A^4$ and $A^5$ are independently 1,4-cyclohexylene, 1,4-phenylene, pyridine-2,5-diyl, pyrimidine-2,5-diyl, naphthalene-2,6-diyl, fluorene-2,7-diyl, or 1,4-phenylene in which at least one hydrogen is replaced by fluorine or chlorine; $B^2$ is a single bond, 1,4-phenylene, naphthalene-2,6-diyl, biphenyl-4,4'-diyl, fluorene-2,7-diyl, 9-methylfluorene-2,7-diyl, 9-ethylfluorene-2,7-diyl, 9,9-dimethylfluorene-2,7-diyl, 9-chlorofluorene-2,7-diyl, 9,9-difluorofluorene-2,7-diyl, or 1,4-phenylene in which at least one hydrogen is replaced by halogen, —CH$_3$, —CH$_2$CH$_3$, —CF$_3$ or toluyl; $Z^1$ and $Z^2$ are independently a single bond, —COO—, —OCO—, —CH$_2$CH$_2$— or —C≡C—; $X^5$ and $X^6$ are independently a single bond or —O—; q is 1 or 0; p, r and s are independently an integer of 0 to 20.

Especially preferred examples of the compound (M1) are monofunctional liquid-crystal acrylate derivatives represented by Formula (M1a) to Formula (M1h):

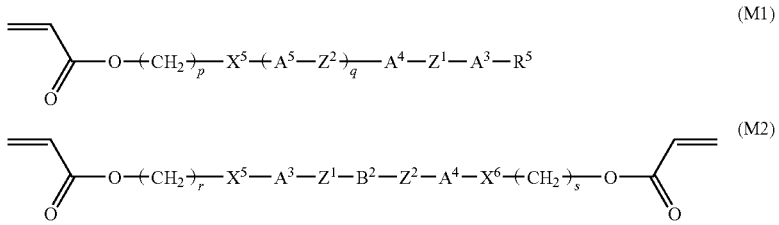

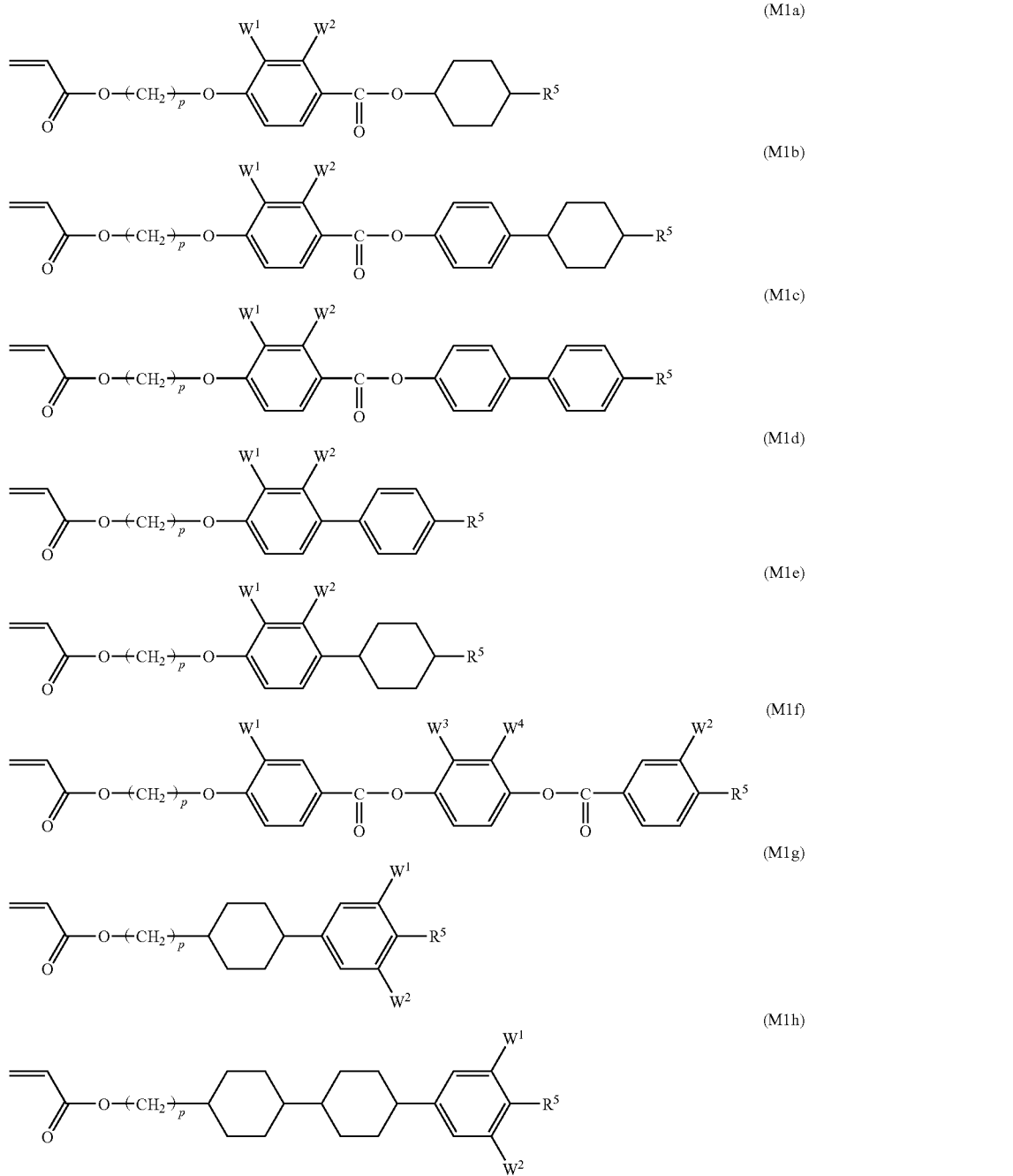
Especially preferred examples of the compound (M2) are bifunctional liquid-crystal acrylate derivatives represented by Formula (M2a) to Formula (M2f):
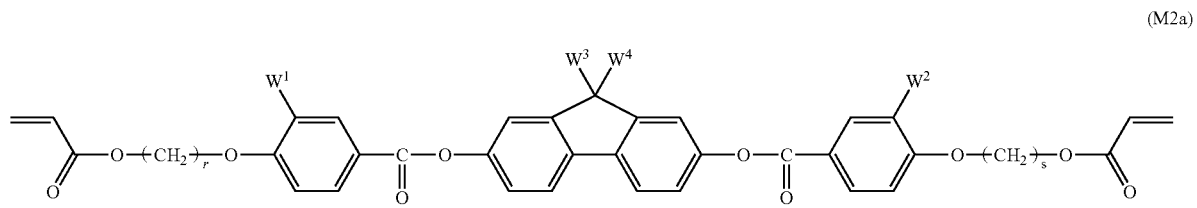

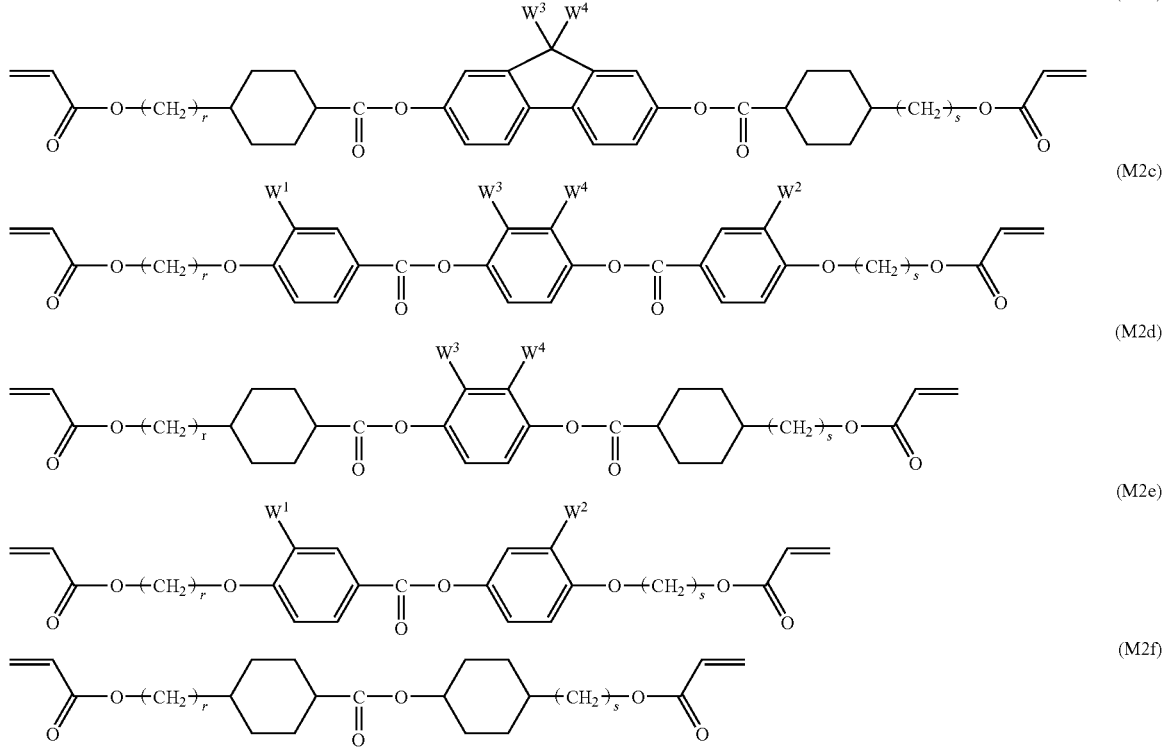

In Formula (M1a) to Formula (M2f), $R^5$, p, r and s have the same meanings as in Formula (M1) or Formula (M2); $W^1$ and $W^2$ are independently hydrogen, chlorine or fluorine; $W^3$ and $W^4$ are independently hydrogen, chlorine, fluorine, methyl, ethyl or trifluoromethyl.

Preferred examples of the liquid-crystal composition of the invention are the following composition (MIX1) to (MIX4):

Composition (MIX1): This is a liquid-crystal composition comprising at least two compounds (1).

Composition (MIX2): This is a liquid-crystal composition comprising at least one compound (1) and at least one compound (M1).

Composition (MIX3): This is a liquid-crystal composition comprising at least one compound (1) and at least one compound (M2).

Composition (MIX4): This is a liquid-crystal composition comprising at least one compound (1), at least one compound (M1) and at least one compound (M2).

In the composition (MIX2) to the composition (MIX4), the content of the compound (1) is 1 to 99% by weight based on the total amount of the composition.

For improving the physical properties of the composition, any other component than the compound (1), the compound (M1) and the compound (M2) may be added to any of the above-mentioned compositions. Examples of the other component are a non-polymerizable liquid-crystal compound, a polymerizable or non-polymerizable optically-active compound, a non-liquid-crystalline polymerizable compound, a polymerization initiator, a solvent, a surfactant, an antioxidant, a filer, a UV absorbent and a chain transfer agent. Not interfering with the object of the invention, any others than these examples may also be added to the composition. For these compounds, any known ones may be favorably used. The content of each component is preferably so defined that it does not detract from the liquid-crystal property of the composition. Even when the atoms constituting the component of the composition may contain a larger amount of their isotopes than in naturally-existing compounds, then the component is also preferable since it may have the same properties.

Of the non-polymerizable liquid-crystal compound and the polymerizable or non-polymerizable optically-active compound, examples of the non-polymerizable liquid-crystal compound are liquid-crystalline compounds described in the liquid-crystal compound data base LiqCryst (registered trade mark) sold by Fujitsu Kyushu Engineering. In the invention, any optically-active compounds are employable so far as they can be suitably mixed with a polymerizable liquid-crystal composition capable of inducing a helical structure and capable of being a base. Preferred examples of the non-polymerizable optically-active compound are Compound (OP-1) to Compound (OP-13).

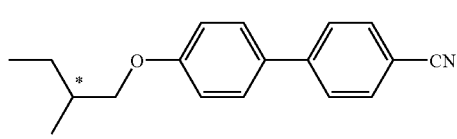
(Op-1)

-continued
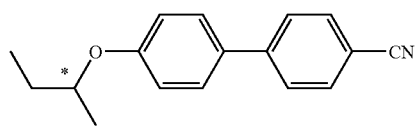 (Op-2)
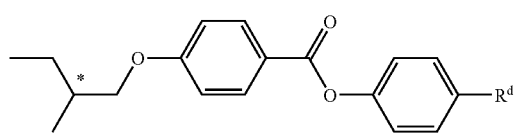 (Op-3)
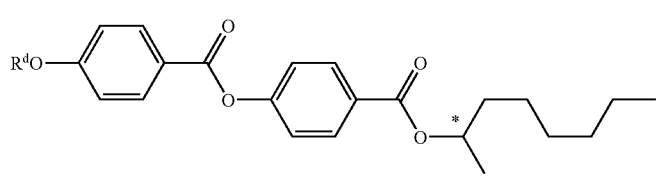 (Op-4)
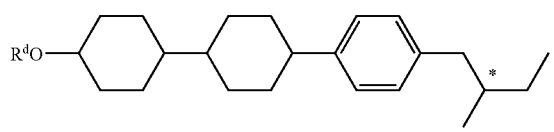 (Op-5)
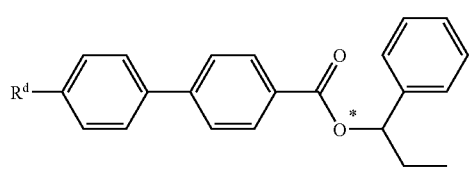 (Op-6)
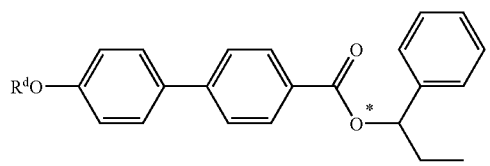 (Op-7)
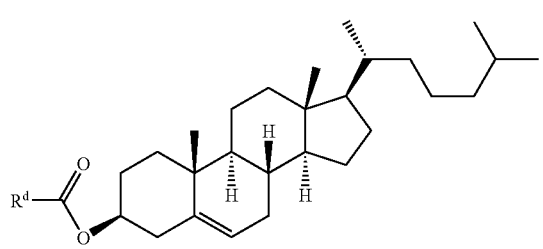 (Op-8)
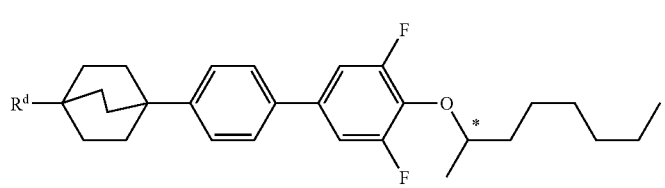 (Op-9)
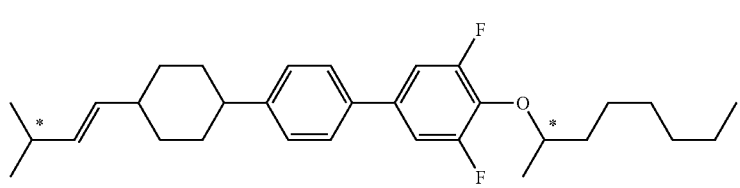 (Op-10)

-continued

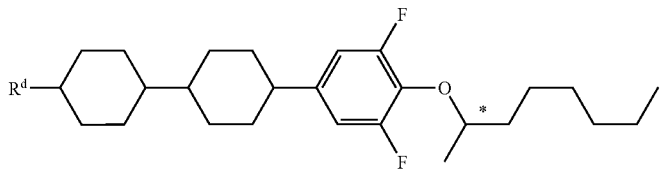
(Op-11)

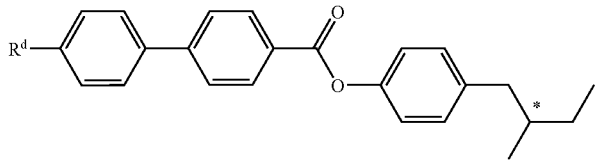
(Op-12)

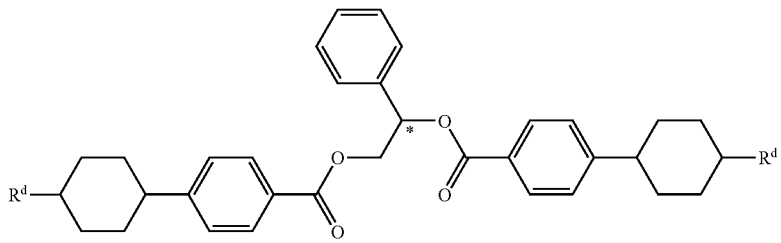
(Op-13)

In these formulae, Rd is alkyl having 1 to 10 carbon atoms; the carbon with * is a chiral carbon.

The optically active compound may be any of a polymerizable compound or a non-polymerizable compound. In consideration of the heat resistance and solvent resistance of the composition, the compound is preferably a polymerizable optically-active compound. Typical examples of the polymerizable optically-active compounds are disclosed in DE 10221751. Especially preferred compounds are the following (Op-14) to (Op-22):

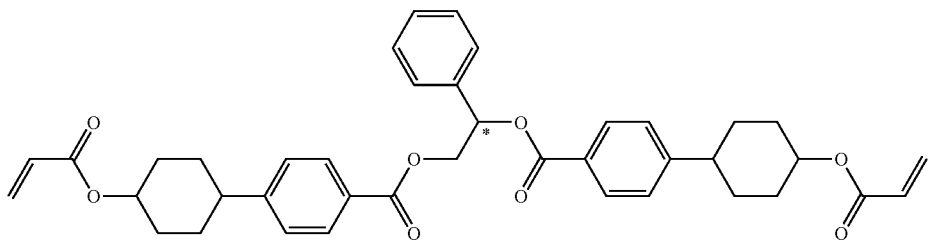
(Op-14)

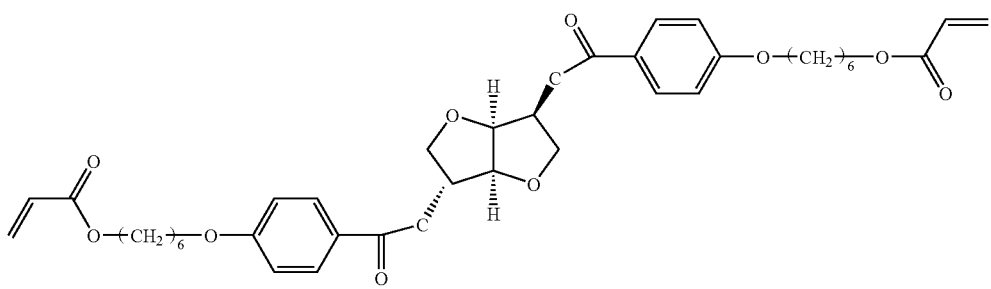
(OP-15)

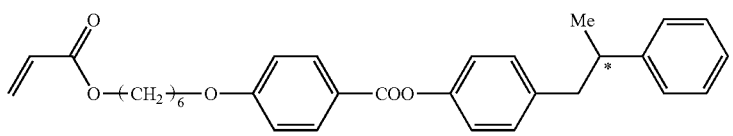
(OP-16)

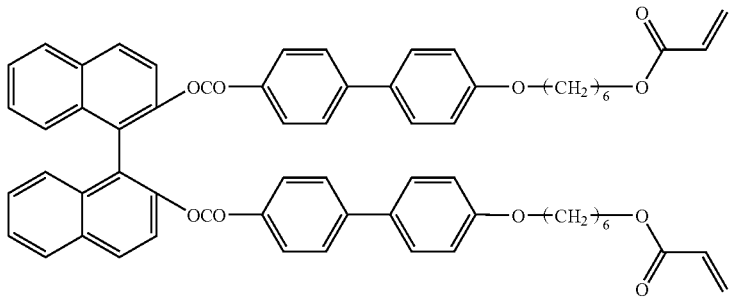
(Op-17)

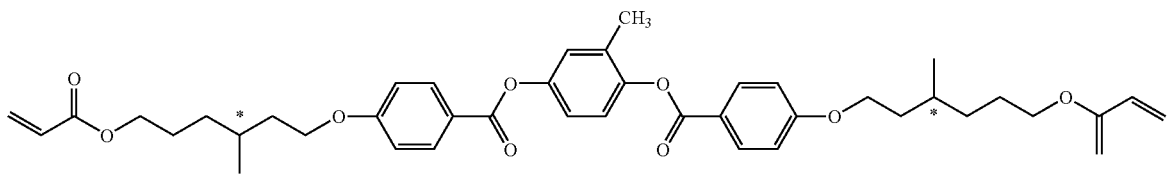
(Op-18)

Next, the polymer is described.

The compound (1) has a polymerizable group. Radical polymerization of the compound (1) gives a polymer. When only one type of the compound (1) is polymerized, then a homopolymer is obtained. The polymer comprises one constitutive unit. When a composition containing at least two types of the compound (1) is polymerized, then a copolymer is obtained. The copolymer has at least two constitutive units. For producing optically-anisotropic films, which is an object of the invention, it is desirable that the monomer is polymerized in an aligned liquid-crystal state thereof, for which, therefore, photoradical polymerization is especially preferred.

Use and applications of the polymer of the invention are mentioned below.

Thermoplastic resin is usable for adhesives, synthetic polymers having mechanical anisotropy, cosmetics, decorations, non-linear optical materials and information memory materials. Thermoplastic resin is a linear polymer in which the branched structure is small, and this is obtained by polymerizing the compound or the liquid-crystal composition of the invention of essentially a monofunctional compound. The polymer may have a weight-average molecular weight of from 500 to 1,000,000, preferably from 1,000 to 500,000, more preferably from 5,000 to 100,000.

Thermosetting resin may be utilized for retarders, polarizing devices, liquid-crystal aligned films, antireflection films, selective reflection films, viewing angle-compensatory films. Thermosetting resin is a polymer having a three-dimensional network structure, and is obtained by polymerizing the compound or the liquid-crystal composition of the invention of essentially a bifunctional compound. The polymer has a high degree of polymerization. When its branching is promoted, then the polymer becomes hardly soluble in solvent, and has a high hardness. The molecular weight of the polymer is difficult to measure, and could not be defined herein. Preferably, the molecular weight of the polymer is as large as possible.

For controlling the film-forming ability and the mechanical strength of the polymer, a non-liquid-crystalline polymerizable compound may be added to the composition. Preferred examples of the non-liquid-crystalline polymerizable compound are (meth)acrylate compounds, vinyl compounds, styrene compounds and vinyl ether compounds.

Preferred examples of the non-liquid-crystalline polymerizable compound that may be added to the liquid-crystal compositions (MIX1) to (MIX4) of the invention are methyl (meth)acrylate, ethyl (meth)acrylate, butyl (meth)acrylate, 2-ethylhexyl (meth)acrylate, phenyl (meth)acrylate, vinyl acetate, vinyl pivalate, vinyl 2,2-dimethylbutanoate, vinyl 2,2-dimethylpentanoate, vinyl 2-methyl-2-butanoate, vinyl propionate, vinyl stearate, vinyl 2-ethyl-2-methylbutanoate, N-vinylacetamide, vinyl p-t-butylbenzoate, vinyl N,N-dimethylaminobenzoate, vinyl benzoate, styrene, o-chloromethylstyrene, m-chloromethylstyrene, p-chloromethylstyrene, α-methylstyrene, tetrafluoroethylene and hexafluoropropene.

For more increasing the film-forming ability of the polymer, a polyfunctional acrylate may be added to the composition. Preferred polyfunctional acrylates are 1,4-butanediol diacrylate, 1,6-hexanediol diacrylate, 1,9-nonanediol diacrylate, neopentylglycol diacrylate, triethylene glycol diacrylate, dipropylene glycol diacrylate, tripropylene glycol diacrylate, tetraethylene glycol diacrylate, trimethylolpropane triacrylate, trimethylol EO-added triacrylate, pentaerythritol triacrylate, trisacryloxyethyl phosphate, bisphenol A EO-added diacrylate, bisphenol A glycidyl diacrylate (Osaka Organic Chemistry's trade name, Biscoat 700), and polyethylene glycol diacrylate.

For facilitating the application of the liquid-crystal composition of the invention to substrates, or for controlling the liquid-crystal phase alignment, a surfactant may be added to the composition not detracting from the effect of the invention. Examples of the surfactant are imidazolines, quaternary ammonium salts, alkylamine oxides, polyamine derivatives, polyoxyethylene-polyoxypropylene condensates, polyethylene glycol and its esters, sodium laurylsulfate, ammonium laurylsulfate, laurylsulfate amine salts, alkyl-substituted aromatic sulfonic acid salts, alkylphosphate salts, aliphatic sulfonic acid/formalin condensates, aromatic sulfonic acid/formalin condensates, laurylamidopropylbetaine, laurylaminoacetylbetaine, polyethylene glycol fatty acid esters, polyoxyethylene alkylamines, perfluoroalkylsulfonic acid salts, perfluoroalkylcarboxylic acid salts, perfluoroalkyl ethyleneoxide adducts, perfluoroalkyltrimethylammonium salts, perfluoroalkyl group and hydrophilic group-having oligomers, perfluoroalkyl group and oleophilic group-having oligomers, and perfluoroalkyl group-having urethanes. The amount of the surfactant to be added differs depending on the type of the surfactant and the compositional ratio of the photopolymerizable liquid-crystal composition, but may fall between 0.0001 and 0.05 in terms of the ratio by weight to the photopolymerizable liquid-crystal composition. Preferably, the ratio falls between 0.001 and 0.01.

An ordinary photoradical polymerization initiator may be added to the composition (MIX1) to the composition (MIX4) of the invention. Examples of the photoradical polymerization initiator are Ciba Specialty Chemical's commercial products, Darocure 1173 (2-hydroxy-2-methyl-1-phenylpropan-1-one), Irgacure 184 (1-hydroxycyclohexyl phenyl ketone), Irgacure 651 (2,2-dimethoxy-1,2-diphenylethan-1-one), Irgacure 500, Irgacure 2959, Irgacure 907, Irgacure 369, Irgacure 1300, Irgacure 819, Irgacure 1700, Irgacure 1800, Irgacure 1850, Darocure 4265, Irgacure 784.

Other examples of the photoradical polymerization initiator are p-methoxyphenyl-2,4-bis(trichloromethyl)triazine, 2-(p-butoxystyryl)-5-trichloromethyl-1,3,4-oxadiazole, 9-phenylacridine, 9,10-benzophenazine, benzophenone/Michler's ketone mixture, hexaarylbiimidazole/mercaptobenzimidazole mixture, 1-(4-isopropylphenyl)-2-hydroxy-2-methylpropane-1-one, benzyldimethyl ketal, 2-methyl-1-[4-(methylthio)phenyl]-2-morpholinopropan-1-one, 2,4-diethylxanthone/methyl p-dimethylaminobenzoate mixture, and benzophenone/methyltriethanolamine mixture.

When the liquid-crystalline compound or the liquid-crystal composition of the invention is polymerized, then a shaped article of the invention can be obtained. The shaped article of the invention includes films and plates, but films are preferred. The shaped article of the invention has optical anisotropy. The optically-anisotropic shaped article of the invention may be produced according to a process that comprises applying a photopolymerizable liquid-crystal composition of the invention onto a support to form a coating film thereon, followed by fixing the nematic alignment formed by the composition having a liquid-crystal state in the film through irradiation with light. The alignment may be grouped into homogeneous (parallel), homeotropic (vertical), hybrid, tilted, and twisted. Homogenous means that the alignment vector is parallel to the substrate and is in one direction. Homeotropic means that the alignment vector is vertical to the substrate. Hybrid means that the alignment vector changes from parallel to standing vertical as it is remoter from the substrate. Tilted means that the alignment vector stands on the substrate at a predetermined tilt angle. The supporting substrate may be any one capable of having a coating film of a liquid-crystal composition formed on its surface, for which, for example, usable are triacetyl cellulose, polyvinyl alcohol, polyimide, polyester, polyarylate, polyetherimide, polyethylene terephthalate, polyethylene naphthalate. Other concrete commercial products are JSR's "Arton", Nippon Zeon's "Zeonex" and "Zeonoa", and Mitsui Chemical's "Apel", and these are usable herein. The support may be a uni-axially stretched film or a bi-axially stretched film.

On the other hand, twisted alignment is seen in a composition having a chiral nematic phase or cholesteric phase. Twisted means that the alignment vector is parallel to the substrate but is gradually twisted as it is remoter from the substrate. The twist is caused by the effect of the optically-active group in the composition.

In producing the optically-anisotropic film of the invention, it is especially desirable to use a triacetyl cellulose film as the supporting substrate. A triacetyl cellulose film may be used as the supporting substrate directly as it is, but if desired, it may be subjected to surface treatment such as saponification treatment, corona discharge treatment or UV-ozone treatment.

In forming the coating film, the photopolymerizable liquid-crystal composition may be dissolved in a suitable solvent and applied to the substrate. Examples of the solvent are benzene, chlorobenzene, toluene, xylene, mesitylene, n-butylbenzene, diethylbenzene, tetralin, methoxybenzene, 1,2-dimethoxybenzene, ethylene glycol dimethyl ether, diethylene glycol dimethyl ether, acetone, methyl ethyl ketone, methyl isobutyl ketone, cyclohexanone, ethyl acetate, methyl lactate, ethyl lactate, ethylene glycol monomethyl ether acetate, propylene glycol monomethyl ether acetate, propylene glycol monoethyl ether acetate, γ-butyrolactone, 2-pyrrolidone, N-methyl-2-pyrrolidone, dimethylformamide, chloroform, dichloromethane, carbon tetrachloride, dichloroethane, trichloroethylene, tetrachloroethylene, t-butyl alcohol, diacetone alcohol, glycerin, monoacetin, ethylene glycol, triethylene glycol, hexylene glycol, ethylene glycol monomethyl ether, ethyl cellosolve, and butyl cellosolve. These may be used alone or as a mixed solvent of two or more of them.

The photopolymerizable liquid-crystal composition may be applied onto the substrate in any method of spin coating, roll coating, curtain coating, flow coating, printing, microgravure coating, gravure coating, wire bar coating, dipping, spraying, meniscus coating or casting to form a thin film thereon, and the solvent may be removed from the film by drying it.

Preferred methods for alignment of the surface of the substrate are described. For example, a thin film of ordinary polyimide or polyvinyl alcohol is formed and this is rubbed with a rayon cloth, or silicon oxide is deposited on the film in a mode of oblique vapor deposition. A stretched film or a rubbing-free aligned film processed by polarized UV rays or ion beams may also be used. In addition, metal substrates of aluminium, iron or copper of which the surface is grooved in slits and glass substrates of alkali glass, borosilicate glass or flint glass etched in slits, may also be used as aligned substrates.

The aligned liquid-crystal layer is irradiated with electromagnetic waves such as UV rays or electron rays, whereby the alignment is fixed. The UV rays preferably have a longer wavelength than 300 nm, not absorbed by the components of the liquid-crystal composition. The dose of the electron rays is preferably from 1 to 200 Mrad. This is because, if the dose is too large, then the copolymer may be degraded. The temperature for electromagnetic wave irradiation may be any one at which the composition is in a liquid-crystal state. However, if it is higher than 100° C., then thermal polymerization may occur to disorder the alignment. Therefore, the temperature is preferably not higher than 100° C.

When an optically-active compound is added to the liquid-crystal composition of the invention, or when an optically-active compound of the invention is added thereto, then the liquid-crystal composition exhibits a helical structure. Therefore, when this is aligned and polymerized in a liquid-crystal state thereof, then a retarder having a helical structure can be produced. In this case, the alignment is a twisted alignment. The alignment vector is parallel to the substrate and is gradually twisted as it is remoter from the substrate. When the helical pitch is 1/n of the wavelength of light (in which n indicates a mean refractive index of the optically-anisotropic thin film obtained), then the film may selectively reflect any of right-handed or left-handed circularly-polarized light having the wavelength depending on the direction of the helical structure of the film and according to a Bragg's rule. This means that the film is usable, for example, as a device having a circularly-polarized light separation function. The direction of the helical structure depends on the steric configuration of the optically-active compound. Suitably selecting the steric configuration of the optically-active compound to be in the composition makes it possible to induce a desired helical direction in the film formed. For example, according to the method disclosed in JP 6-281814-A, a shaped article is obtained in which the helical pitch continuously varies in the direction of the thickness of the shaped article, and the shaped article may reflect light that falls within a broad wavelength range in accordance with the pitch.

The polymer is useful also as a brightness-improving film. For example, according to the method disclosed in JP-A 6-281814, a polymer is obtained in which the helical pitch continuously varies in the direction of the thickness of the polymer. The polymer may reflect light that falls within a broad wavelength range in accordance with the pitch. The polymer may selectively reflect light that falls within a range of from 100 to 350 nm (or within a range of from 350 to 750 nm).

The thickness of the thin film of which the alignment is fixed varies depending on the desired optical function and other properties of the film and on the degree of optical anisotropy thereof. Accordingly, though not strictly defined, the preferred thickness of the film may fall between 0.05 and 50 μm, more preferably between 0.1 and 20 μm, even more preferably between 0.5 and 10 μm. Also preferably, the haze value of the optically-anisotropic thin film is at most 1.5%, more preferably at most 1.0%; the transmittance thereof is at least 80%, more preferably at least 85%. It is desirable that the transmittance of the film falls within the range as above in a visible light region. The haze value of at most 1.5% of the film is a preferred condition so as not cause a problem with the film in point of the polarizability thereof. The transmittance of at least 80% of the film is also a preferred condition so as to ensure the brightness of liquid-crystal display devices in which the optically-anisotropic thin film is used.

EXAMPLES

The invention is described in more detail with reference to the following Examples. The phase transition temperature described in the Examples is determined as follows: A sample is put on a hot plate of a melting point analyzer fitted with a polarizing microscope, and heated at a rate of 1° C./min. C means a crystal; N means a nematic phase; Sx means an unidentified smectic phase; and I means an isotropic liquid. NI point means the uppermost limit temperature of a nematic phase, and this is a transition temperature from N to I. "C 50 N 63 I" is meant to indicate transition from C to N at 50° C. and transition from N to I at 63° C. The pencil hardness is determined according to a method in JIS, "JIS-K-5400, 8.4 Pencil Scratch Test". The Cellotape (adhesive tape) peeling test is a test method in JIS, "JIS-5400, 8.5 Adhesiveness (8.5.2 Cross-Cut Tape Method)". Briefly, the adhesiveness of a sample is determined according to the number of remaining crosscuts of the total 100 crosscuts. The substrate used in the test is a TAC film having a degree of acetylation of 2.9. The alignment state of the liquid-crystal molecules on the substrate is confirmed as follows: The sample to be analyzed is sandwiched between two polarizers set in a cross-Nicol, and the angle dependency of the transmitted light strength indicates the alignment state of the sample.

Example 1

<Production of Compound (1a)>

(First Stage)

A solution prepared by adding 20 g of 4-cyano-4'-hydroxybiphenyl, 20 g of allyl bromide and 25 g of potassium carbonate to 250 ml of 2-butanone was refluxed for 7 hours. Water was added to the reaction solution for liquid-liquid separation, and the organic layer was washed with water and dried with anhydrous magnesium sulfate. The solvent was evaporated away, and the resulting residue was purified through silica gel column chromatography using toluene as an eluent solvent and then further recrystallized from ethanol to obtain 22 g of 4-allyloxy-4'-cyanobiphenyl.

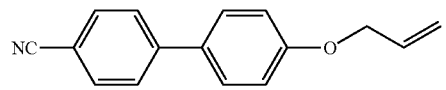

C 82 (N 79.8) I

According to the method, the following compound was produced. The compound did not show a liquid-crystal phase.

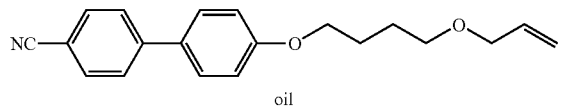

oil (Second Stage)

20 g of m-chloroperbenzoic acid divided into portions was added in a few times to a solution prepared by dissolving 19 g of 4-allyloxy-4'-cyanobiphenyl in 150 ml of methylene chloride, and stirred at room temperature for 24 hours. The deposited insoluble was filtered away, water was added to it for liquid-liquid separation, and the organic layer was washed with an aqueous saturated sodium hydrosulfite solution and then dried with anhydrous magnesium sulfate. The solvent was evaporated away, and the residue was purified through silica gel column chromatography and further recrystallized from ethanol to obtain 13 g of 4-cyano-4'-glycidylbiphenyl.

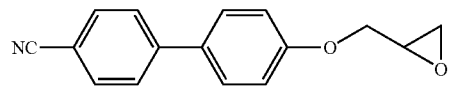

C 115 I

According to the method, the following compound was produced. This showed a phase transition temperature.

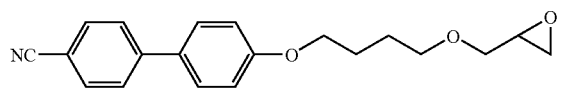

C 53.6 N 56.4 I (Third Stage)

A solution prepared by adding 1 g of 4-cyano-4'-glycidyl-biphenyl, 0.5 g of acrylic acid, 0.07 g of tetrabutylammonium bromide and 0.02 g of 2,6-di-t-butyl-p-cresol to 50 ml of toluene was refluxed for 5 hours while bubbled with air. 100 ml of chloroform and water were added to it for liquid-liquid separation, and the organic layer was dried with anhydrous magnesium sulfate. The solvent was evaporated away, and the resulting residue was purified through silica gel column chromatography and further recrystallized to obtain 0.5 g of Compound No. 1.

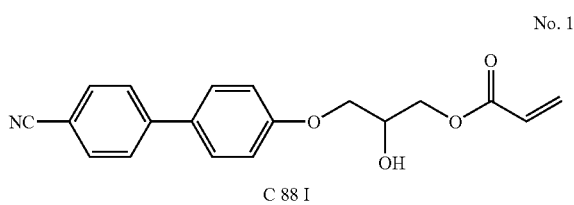

No. 1

C 88 I

According to the method, Compound No. 4 was produced. This compound did hot show a liquid-crystal phase.

was evaporated away. 20 g of sodium hydroxide, 50 ml of water and 200 ml of ethanol were added to the resulting residue, and refluxed for 2 hours. Ethanol was evaporated away, and hydrochloric acid was added to make it acidic, and then extracted with diethyl ether and dried with anhydrous magnesium sulfate. The solvent was evaporated away, and the resulting residue was recrystallized from a mixed solvent of ethanol and water to obtain 29 g of 4-(4-allyloxybutyloxy)benzoic acid.

Phase Transition Temperature: C 94 N 107 I

According to the method, the following benzoic acid derivatives were produced.

4-allyloxybenzoic acid (m.p.: 164 to 165° C.)

4-(3-butenyloxy)benzoic acid (phase transition temperature: C 121 N 141.5 I)

(Second Stage)

1.34 g of 4-(4-allyloxybutyloxy)benzoic acid and 0.46 g of 2,7-dihydroxy-9-methylfluorene were dissolved in 30 ml of methylene chloride and cooled to 5° C. 0.01 g of dimethylaminopyridine and 1.15 g of 1-ethyl-3-(3-dimethylaminopropyl)carbodiimide hydrochloride were added to it, and stirred at room temperature for 12 hours. 50 ml of water was added to it for liquid-liquid separation, and the organic layer was dried with anhydrous magnesium sulfate. The solvent was evaporated away, and the resulting residue was purified through silica gel chromatography, and recrystallized from a mixed solvent of ethanol and ethyl acetate to obtain 0.6 g of 2,7-di[4-(4-allyloxybutyloxy)benzoyloxy]-9-methylfluorene.

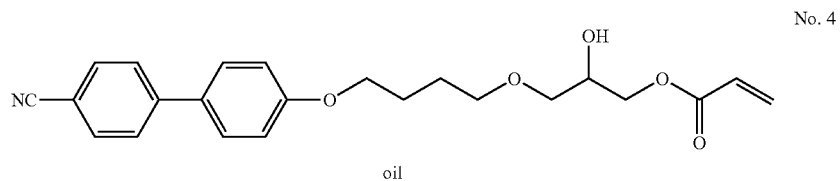

No. 4 oil

Example 2

<Production of Compound (1b)>

(First Stage)

A solution comprising 14 g of allyl (4-chlorobutyl) ether, 14 g of 4-hydroxybenzoic acid, 14 g of potassium carbonate

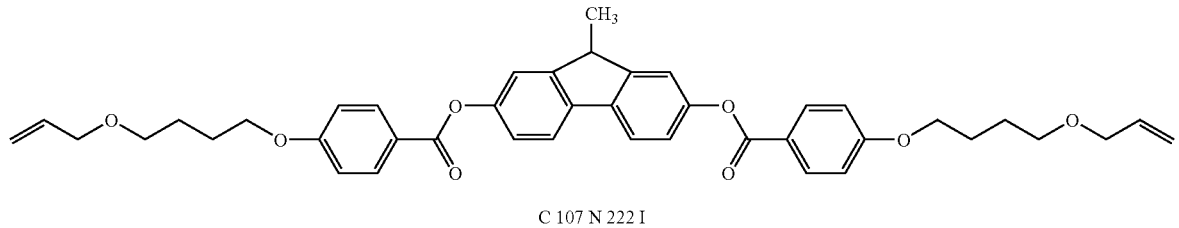

C 107 N 222 I and 50 ml of dimethylformamide was stirred at 90° C. for 3 hours. Water was added to it, and extracted with toluene, and the toluene layer was well washed with water, and toluene According to the method, the following compounds were produced. These are shown below along with their phase transition temperature.

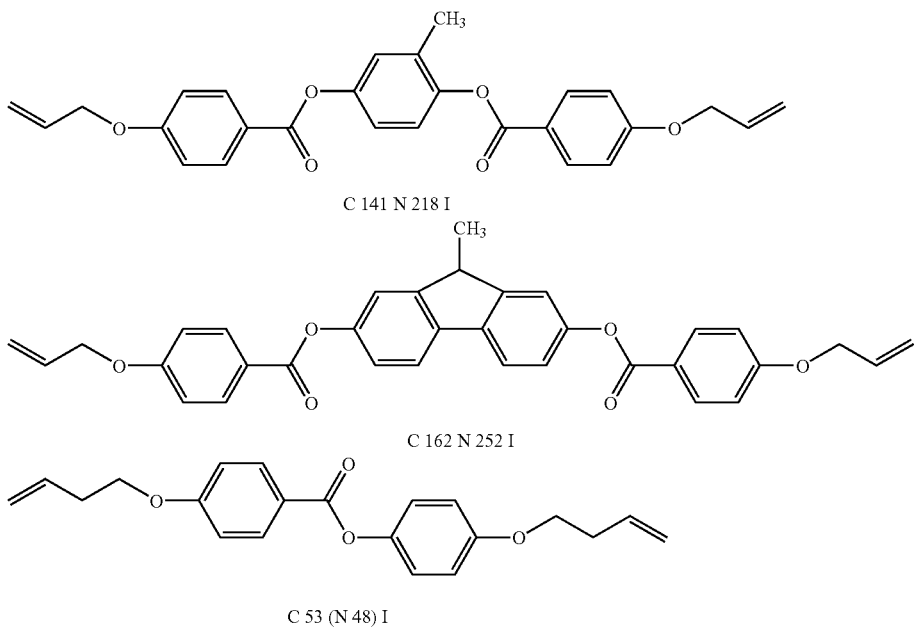

C 141 N 218 I

C 162 N 252 I

C 53 (N 48) I (Third Stage)

0.5 g of m-chlorobenzoic acid was added to a solution of 0.64 g of 2,7-di[4-(4-allyloxybutyloxy)benzoyloxy]-9-methylfluorene and 10 ml of methylene chloride, and stirred at room temperature for 2 days. The reaction solution was washed with an aqueous 5% sodium hydroxide solution, an aqueous sodium hydrogensulfite solution and an aqueous sodium hydrogencarbonate solution in that order, and then dried with anhydrous magnesium sulfate. The solvent was evaporated away, and the resulting residue was purified through silica gel column chromatography and recrystallized from a mixed solvent of ethanol/ethyl acetate to obtain 0.56 g of 2,7-di[4-(4-glycidyloxybutyloxy)benzoyloxy]-9-methylfluorene.

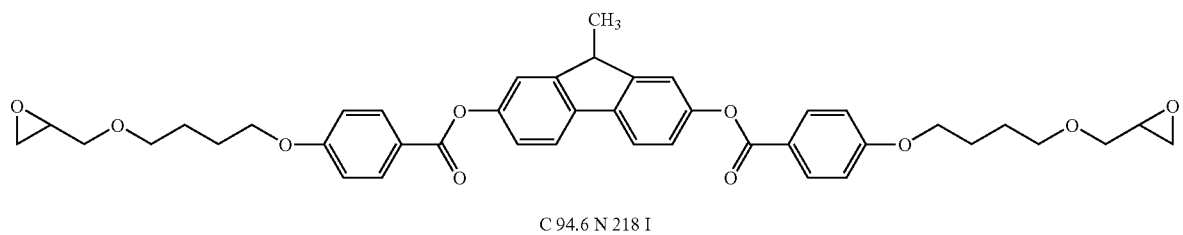

C 94.6 N 218 I

According to the method, the following compounds were produced. These are shown below along with their phase transition temperature.

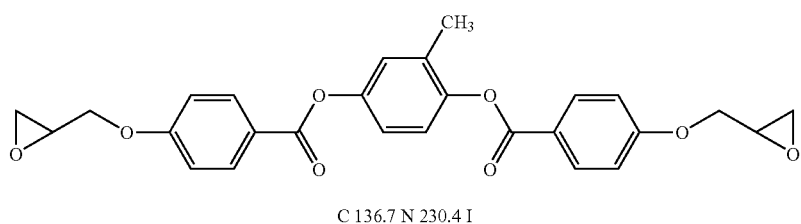

C 136.7 N 230.4 I

-continued

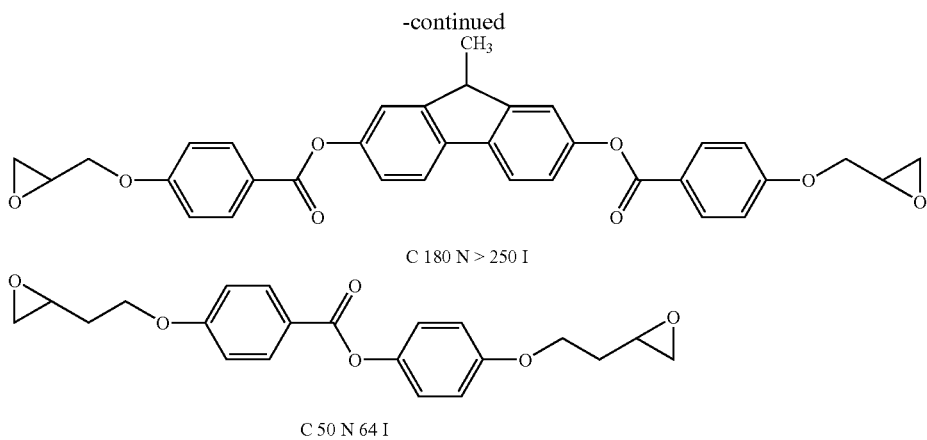

C 180 N > 250 I

C 50 N 64 I (Fourth Stage)

A solution prepared by adding 5 g of 2,7-di[4-(4-glycidyloxybutyloxy)benzoyloxy]-9-methylfluorene, 5 g of acrylic acid, 1 g of tetrabutylammonium bromide and 0.05 g of 2,6-di-t-butyl-p-cresol to 100 ml of toluene was refluxed for 5 hours while bubbled with air. 100 ml of chloroform and water were added to it for liquid-liquid separation, and the organic layer was dried with anhydrous magnesium sulfate. The solvent was evaporated away, and the resulting residue was purified through silica gel column chromatography and recrystallized to obtain 0.5 g of Compound No. 71.

No. 71

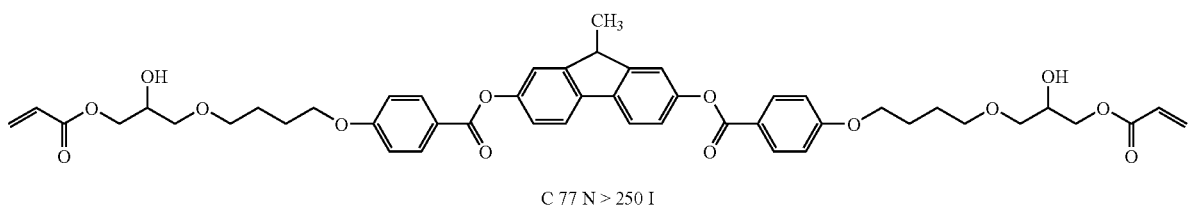

C 77 N > 250 I

According to the method, the following compounds were produced. These are shown below along with their phase transition temperature.

No. 49

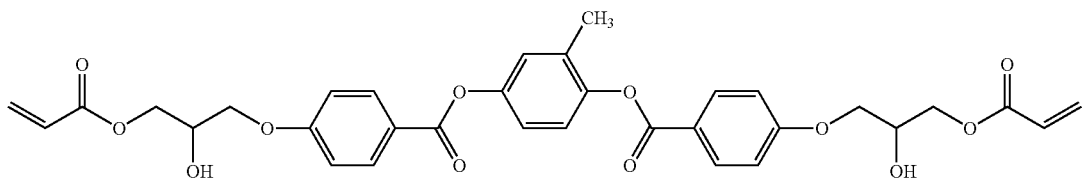

C 63 Sx 97 N 111 I

No. 76

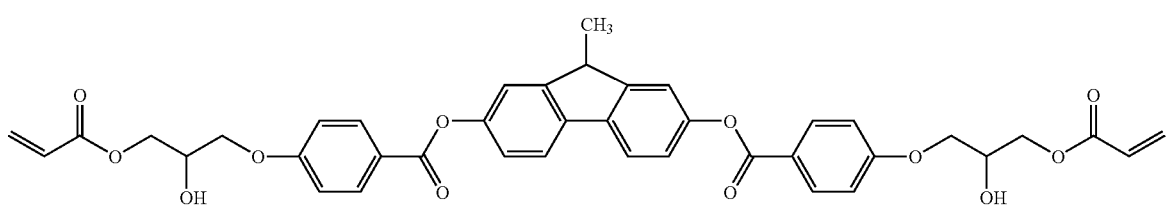

C 113 Sx > 250 I

-continued

No. 42

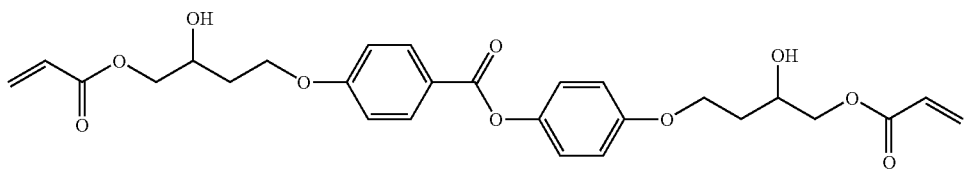

C 66 I

Example 3

<Example of Composition (MIX1)>

The following composition (CL1) comprising Compound No. 1 and Compound No. 49 was prepared. The composition showed a nematic liquid-crystal phase at room temperature, and its NI point was 73° C. The composition (CL1) did not crystallize even at room temperature and kept its liquid-crystal state. When the composition (CL1) was applied onto a rubbed TAC film and aligned thereon, it showed a homogeneous alignment.

No. 1

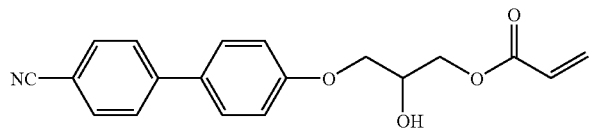

50 wt-%

No. 49

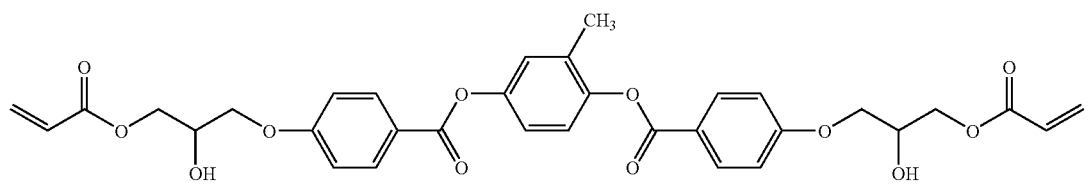

50 wt-%

Example 4

<Example of Composition (MIX3)>

The following composition (CL2) comprising Compound No. 1 and Compound (A1) was prepared. The composition showed a nematic liquid-crystal phase at room temperature, and its NI point was 97° C. The composition (CL2) did not crystallize even at room temperature and kept its liquid-crystal state. When the composition (CL2) was applied onto a rubbed TAC film and aligned thereon, it showed a homogeneous alignment.

No. 1

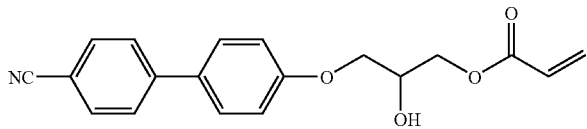

50 wt-%

A1

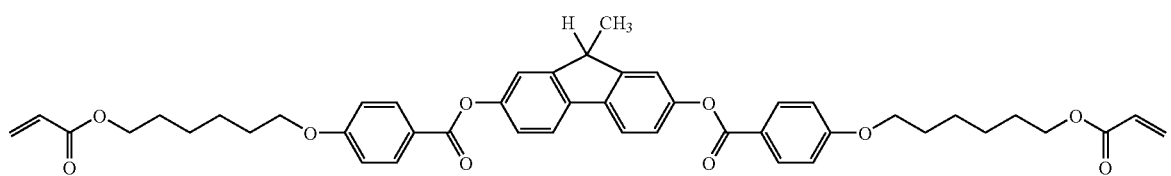

50 wt-%

Example 5

<Production of Aligned Film through Irradiation with UV Rays>

A solution prepared by dissolving 10 g of the composition (CL1) and 0.3 g of Irgacure 907 (trade name) in 80 g of cyclopentanone was applied onto a triacetylcellulose film having a degree of acetylation of 2.9, of which the surface had been rubbed with a rayon cloth, by the use of a microgravure coater. After coated, this was left at room temperature for 5 minutes to remove the solvent, and the liquid-crystal phase was thereby aligned. Still kept at room temperature, this was irradiated with UV rays from a high-pressure mercury lamp (120 W/cm) for 10 seconds. After thus irradiated, the liquid-crystal phase was polymerized while it still kept the alignment state (homogeneous alignment), and its surface hardness was 2H as a pencil hardness. A liquid-crystal aligned film (F1) of good heat resistance was thus obtained, and it was free from retardation change caused by temperature change (20 to 150° C.).

Example 6

A liquid-crystal aligned film (F2) was produced in the same manner as in Example 5, for which, however, the composition (CL2) was used. The liquid-crystal aligned film (F2) showed a homogeneous alignment. That is, the composition had good alignability and polymerizability with UV rays.

Comparative Example 1

A solution prepared by dissolving 10 g of a bifunctional acrylate compound (A1) and 0.3 g of a polymerization initiator Irgacure 907 (trade name) in 80 g of cyclopentanone was applied onto a triacetylcellulose film having a degree of acetylation of 2.9, of which the surface had been rubbed with a rayon cloth, by the use of a microgravure coater. After thus coated, this was heated in an oven at 85° C. for 5 minutes whereby the solvent was removed and the liquid-crystal phase was aligned. Still kept at the temperature, this was irradiated with UV rays from a high-pressure mercury lamp (120 W/cm) for 10 seconds, while nitrogen was jetted onto the substrate surface. After thus irradiated, the liquid-crystal phase was polymerized, and a homogeneous aligned film (FA1) was obtained. When cured in open air, however, this did not almost polymerize and an aligned film could not be obtained.

The results of the liquid-crystal films in the Cellophane tape peel test and the pencil hardness test are shown below.

| Film Number | Polymerization Atmosphere | Cellophane Tape Peel Test | Pencil Hardness Test |
|---|---|---|---|
| F1 | air | 100/100 | 2H |
| F2 | air | 100/100 | 2H |
| FA1 | nitrogen | 0/100 | 2H |

Specifically, the aligned film (FA1) obtained by polymerizing the bifunctional acrylate of Comparative Example 1 had no cross-cut in the Cellophane tape peel test, as all cross-tapes peeled off. However, in the aligned films obtained by polymerizing the compound and the composition of the invention, no cross-cut peeled away and all cross-cuts remained as they were.

The aligned films (F1) and (F2) obtained from the compositions (CL1) and (CL2) both had a pencil hardness of 2H or so.

The retardation change caused by temperature change (20 to 150° C.) of the aligned films (F1) and (F2) was at most 3%, and these films had good heat resistance.

INDUSTRIAL APPLICABILITY

The liquid-crystal composition and its polymer can be used for retarders, polarizing devices, liquid-crystal aligned films, antireflection films, selective reflection films and viewing angle compensatory films that are constitutive elements of liquid-crystal display devices. The compound of the invention is usable also for adhesives, synthetic polymers of mechanical anisotropy, cosmetics, decorations, non-linear optical materials and information memory materials.

The invention claimed is:

1. A compound represented by Formula (1a) or Formula (1b):

(1a)

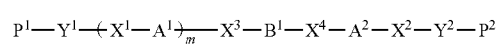

(1b)

wherein $R^1$ is hydrogen, fluorine, chlorine, —CN, —NCO, —NCS, —CF$_3$, —OCF$_3$, —OCHF$_2$, or alkyl having 1 to 20 carbon atoms, any —CH$_2$— in the alkyl may be replaced by —O—, —S—, —COO—, —OCO—, —CO—, —CH═CH— or —C≡C—, any hydrogen in the alkyl may be replaced by halogen, cyano or methyl; when $R^1$ is alkyl having 1 to 20 carbon atoms and when any hydrogen in the alkyl is replaced by halogen, cyano or methyl, then $R^1$ may be an optically-active group; $Y^1$ and $Y^2$ are independently alkylene having 1 to 15 carbon atoms, any —CH$_2$— in the alkylene may be replaced by —O—, —S—, —COO—, —OCO— or —CO—, any hydrogen in the alkylene may be replaced by halogen, cyano or methyl, and when any hydrogen in the alkylene is replaced by halogen, cyano or methyl, then $Y^1$ or $Y^2$ may be an optically-active group; $A^1$ and $A^2$ are independently 1,4-cyclohexylene, 1,4-cyclohexenylene, 1,4-phenylene, pyridine-2,5-diyl, pyridazine-3,6-diyl, pyrimidine-2,5-diyl, naphthalene-2,6-diyl, tetrahydronaphthalene-2,6-diyl, biphenyl-4,4'-diyl, 1,3-dioxane-2,5-diyl, 1,4-cyclohexylene in which at least one hydrogen is replaced by fluorine, or 1,4-phenylene in which at least one hydrogen is replaced by halogen, —CN, —CH$_3$, —CH$_2$CH$_3$, —OCH$_3$, —OH, —CHO, —OCOCH$_3$, —COCH$_3$, —COCF$_3$, —CF$_3$ or —CF$_2$H; $B^1$ is 1,4-cyclohexylene, 1,4-phenylene, naphthalene-2,6-diyl, tetrahydronaphthalene-2,6-diyl, biphenyl-4,4'-diyl, fluorene-2,7-diyl, 9-methylfluorene-2,7-diyl, 9-ethylfluorene-2,7-diyl, 9,9-dimethylfluorene-2,7-diyl, 9-chlorofluorene-2,7-diyl, 9,9-difluorofluorene-2,7-diyl, anthracene-2,7-diyl, anthracene-5,10-diyl, phenanthrene-2,7-diyl, pentacene-2,8-diyl, pyridazine-3,6-diyl, 1,4-phenylene in which at least one hydrogen is replaced by halogen, —CH$_3$, —CH$_2$CH$_3$, —OCH$_3$, —OCH$_2$CH$_3$, —CN, —COCH$_3$, —OCOCH$_3$, —CHO, —OH, —COCF$_3$, —CF$_3$, phenyl or toluyl, or a group represented by any one of Formula (K1) to Formula (K3); $X^1$ and $X^2$ are independently a single bond, —O—, —S—, —COO— or —OCO—; $X^3$ and $X^4$ are independently a single bond, —COO—, —OCO—, —OCH$_2$—, —CH$_2$O—, —OCF$_2$—, —CF$_2$O—, —CH₂CH₂—, —CH=CH—COO— or —C≡C—; m is 0, 1 or 2, when m is 2, then two X¹'s and two A¹'s both may be the same group or different groups; P¹ and P² are independently a group represented by any one of Formula (P1) to Formula (P4); when X³ is a single bond and A² and B¹ are 1,4-phenylene or 1,4-phenylene in which any hydrogen is replaced by methyl, ethyl or halogen, then X⁴ is —COO—, —OCO—, —OCH₂—, —CH₂O—, —OCF₂—, —CF₂O—, —CH₂CH₂—, —CH=CH—COO— or —C≡C—; with the proviso that in Formula (1b), when P¹=P²=Formula (P1) or Formula (P2), X³=X²=a single bond, m=0, B1=A2=1,4-phenylene, and X⁴=—COO—, then Y¹ is not —O—:

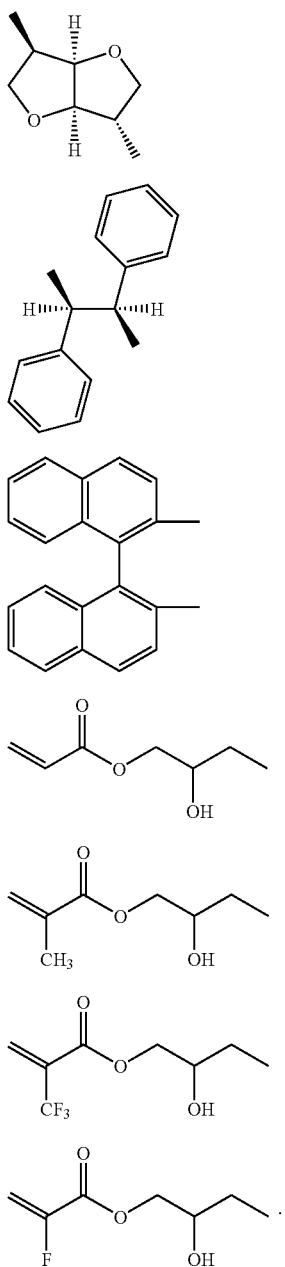

2. The compound according to claim 1, wherein R¹ is hydrogen, fluorine, chlorine, —CN, —NCO, —NCS, —CF₃, —OCF₃, —OCHF₂, or alkyl having 1 to 10 carbon atoms, any —CH₂— in the alkyl may be replaced by —O—, —S—, —COO—, —OCO—, —CO—, —CH=CH— or —C≡C—, any hydrogen in the alkyl may be replaced by halogen, cyano or methyl; when R¹ is alkyl having 1 to 10 carbon atoms and when any hydrogen in the alkyl is replaced by halogen, cyano or methyl, then R¹ may be an optically-active group; Y¹ and Y² are independently alkylene having 1 to 12 carbon atoms, any —CH₂— in the alkylene may be replaced by —O—, —COO—, —OCO— or —CO—, any hydrogen in the alkylene may be replaced by halogen, cyano or methyl, and when any hydrogen in the alkylene is replaced by halogen, cyano or methyl, then Y¹ or Y² may be an optically-active group; A¹ and A² are independently 1,4-cyclohexylene, 1,4-cyclohexenylene, 1,4-phenylene, pyridine-2,5-diyl, pyridazine-3,6-diyl, pyrimidine-2,5-diyl, 1,3-dioxane-2,5-diyl, or 1,4-phenylene in which at least one hydrogen is replaced by halogen, —CN, —CH₃, —CH₂CH₃, —CF₃ or —CF₂H; B¹ is 1,4-phenylene, naphthalene-2,6-diyl, tetrahydronaphthalene-2,6-diyl, biphenyl-4,4'-diyl, fluorene-2,7-diyl, 9-methylfluorene-2,7-diyl, 9-ethylfluorene-2,7-diyl, 9,9-dimethylfluorene-2,7-diyl, 9-chlorofluorene-2,7-diyl, 9,9-difluorofluorene-2,7-diyl, anthracene-2,7-diyl, anthracene-5,10-diyl, phenanthrene-2,7-diyl, 1,4-phenylene in which at least one hydrogen is replaced by halogen, —CH₃, —CH₂CH₃, —OCH₃, —OCH₂CH₃, —CN, —COCH₃, —OCOCH₃, —CHO, —OH, —COCF₃, —CF₃, phenyl or toluyl, or a group represented by any one of Formula (K1) to Formula (K3); X¹ and X² are independently a single bond, —O—, —COO— or —OCO—; X³ and X⁴ are independently a single bond, —COO—, —OCO—, —OCH₂—, —CH₂O—, —OCF₂—, —CF₂O—, —CH₂CH₂—, —CH=CH—COO— or —C≡C—; m is 0, 1 or 2, when m is 2, then two X¹'s and two A¹'s both may be the same group or different groups; P¹ and P² are independently a group represented by any one of Formula (P1) to Formula (P4).

3. The compound according to claim 1, wherein R¹ is hydrogen, fluorine, chlorine, —CN, —CF₃, —OCF₃, —OCHF₂, alkyl having 1 to 10 carbon atoms, alkenyl having 2 to 10 carbon atoms, or alkoxy having 1 to 10 carbon atoms, any hydrogen in the alkyl, alkenyl or alkoxy may be replaced by fluorine, chlorine, cyano or methyl; when R¹ is alkyl having 1 to 10 carbon atoms, alkenyl having 2 to 10 carbon atoms or alkoxy having 1 to 10 carbon atoms and when any hydrogen in these groups is replaced by halogen, cyano or methyl, then R¹ may be an optically-active group; Y¹ and Y² are independently alkylene having 1 to 10 carbon atoms, any —CH₂— in the alkylene may be replaced by —O—, —COO—, —OCO— or —CO—, any hydrogen in the alkylene may be replaced by halogen, cyano or methyl, and when any hydrogen in the alkylene is replaced by halogen, cyano or methyl, then Y¹ or Y² may be an optically-active group; A¹ and A² are independently 1,4-cyclohexylene, 1,4-cyclohexenylene, 1,4-phenylene, pyridine-2,5-diyl, pyridazine-3,6-diyl, pyrimidine-2,5-diyl, 1,3-dioxane-2,5-diyl, or 1,4-phenylene in which at least one hydrogen is replaced by fluorine, chlorine, —CN, —CH₃, —CH₂CH₃, —CF₃ or —CF₂H; B¹ is 1,4-phenylene, naphthalene-2,6-diyl, tetrahydronaphthalene-2,6-diyl, biphenyl-4,4'-diyl, fluorene-2,7-diyl, 9-methylfluorene-2,7-diyl, 9-ethylfluorene-2,7-diyl, 9,9-dimethylfluorene-2,7-diyl, 9-chlorofluorene-2,7-diyl, 9,9-difluorofluorene-2,7-diyl, anthracene-2,7-diyl, anthracene-5,10-diyl, phenanthrene-2,7-diyl, 1,4-phenylene in which at least one hydrogen is replaced by fluorine, chlorine, —CH₃, —CH₂CH₃, —CN, —OH, —COCH₃, —COCF₃ or —CF₃ or a group represented by any one of Formula (K1) to Formula (K3); X¹ and X² are independently a single bond or —O—; X³ and X⁴ are independently a single bond, —COO—, —OCO—, —CH₂CH₂—, —CH═CH—COO— or —C≡C—; m is 0, 1 or 2, when m is 2, then two X¹'s and two A¹'s both may be the same group or different groups; P¹ and P² are independently a group represented by any one of Formula (P1) to Formula (P4).

4. The compound according to claim 1, wherein R¹ is hydrogen, fluorine, chlorine, —CN, —CF₃, —OCF₃, alkyl having 1 to 10 carbon atoms, any hydrogen in the alkyl or alkoxy may be replaced by fluorine, chlorine, —CN or —CH₃; when R¹ is alkyl having 1 to 10 carbon atoms or alkoxy having 1 to 10 carbon atoms and when any hydrogen in these groups is replaced by fluorine, chlorine —CN or —CH₃, then R¹ may be an optically-active group; Y¹ and Y² are independently alkylene having 1 to 10 carbon atoms, any —CH₂— in the alkylene may be replaced by —O—, —COO— or —OCO—, any hydrogen in the alkylene may be replaced by fluorine, chlorine, —CN or —CH₃, and when any hydrogen in the alkylene is replaced by fluorine, chlorine, —CN or —CH₃, then Y¹ or Y² may be an optically-active group; A¹ and A² are independently 1,4-cyclohexylene, 1,4-cyclohexenylene, 1,4-phenylene, pyridine-2,5-diyl, pyridazine-3,6-diyl, pyrimidine-2,5-diyl, 1,3-dioxane-2,5-diyl, or 1,4-phenylene in which at least one hydrogen is replaced by fluorine, chlorine, —CN, —CH₃, —CF₃ or —CF₂H; B¹ is 1,4-phenylene, naphthalene-2,6-diyl, tetrahydronaphthalene-2,6-diyl, biphenyl-4,4'-diyl, fluorene-2,7-diyl, 9-methylfluorene-2,7-diyl, 9-ethylfluorene-2,7-diyl, 9,9-difluorofluorene-2,7-diyl, anthracene-2,7-diyl, phenanthrene-2,7-diyl, 1,4-phenylene in which at least one hydrogen is replaced by fluorine, chlorine, —CH₃, —CN, —OH or —CF₃, or a group represented by any one of Formula (K1) to Formula (K3); X¹ and X² are independently a single bond or —O—; X³ and X⁴ are independently a single bond, —COO—, —OCO—, —CH₂CH₂—, —CH═CH—COO— or —C≡C—; m is 0, 1 or 2, when m is 2, then two X¹'s and two A¹'s both may be the same group or different groups; P¹ and P² are independently a group represented by any one of Formula (P1) to Formula (P4).

5. The compound according to claim 1, wherein m is 0 or 1.

6. The compound according to claim 1, which is represented by Formula (1b) in which m is 0 or 1 and X³ and X⁴ are independently a single bond, —COO—, —OCO—, —OCH₂—, —CH₂O—, —CH₂CH₂—, —CH═CH—COO— or —C≡C—.

7. The compound according to claim 1, wherein R¹ is hydrogen, fluorine, —CN, —OCF₃, alkyl having 1 to 10 carbon atoms, or alkoxy having 1 to 10 carbon atoms, any hydrogen in the alkyl or alkoxy may be replaced by —CH₃, when R¹ is alkyl having 1 to 10 carbon atoms or alkoxy having 1 to 10 carbon atoms and any hydrogen in these groups is replaced by —CH₃, then R¹ may be an optically-active group; Y¹ and Y² are independently alkylene having 1 to 10 carbon atoms, and any —CH₂— in the alkylene may be replaced by —O—, —COO— or —OCO; A¹ and A² are independently 1,4-cyclohexylene, 1,4-phenylene, pyridine-2,5-diyl, or 1,4-phenylene in which at least one hydrogen is replaced by fluorine; B¹ is 1,4-phenylene, naphthalene-2,6-diyl, tetrahydronaphthalene-2,6-diyl, biphenyl-4,4'-diyl, fluorene-2,7-diyl, 9-methylfluorene-2,7-diyl, 9,9-difluorofluorene-2,7-diyl, anthracene-2,7-diyl, 1,4-phenylene in which at least one hydrogen is replaced by fluorine, chlorine, —CH₃, —CN, —OH or —CF₃, or a group represented by any one of Formula (K1) to Formula (K3); X¹ and X² are independently a single bond or —O—; X³ and X⁴ are independently a single bond, —COO—, —OCO—, —CH₂CH₂—, —CH═CH—COO— or —C≡C—; P¹ and P² are independently a group represented by Formula (P1); and m is 0 or 1.

8. A liquid-crystal composition comprising at least one compound described in claim 1 and consisting of two compounds.

9. A liquid-crystal composition comprising at least one compound described in claim 1 and consisting of at least two polymerizable compounds.

10. A liquid-crystal composition consisting of at least two compounds described in claim 1.

11. A liquid-crystal composition comprising at least one compound described in claim 1 and any other polymerizable compound.

12. The liquid-crystal composition described in claim 11, wherein the other polymerizable compound is at least one compound selected from a group of compounds represented by Formula (M1) and Formula (M2):

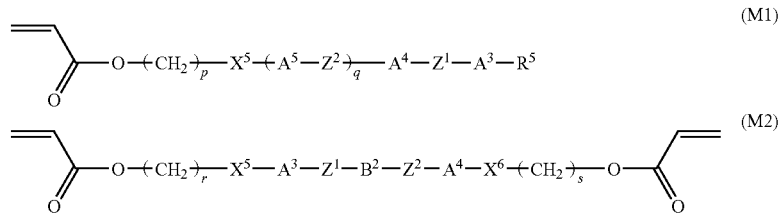

wherein R⁵ is hydrogen, fluorine, chlorine, —CN, or alkyl having 1 to 20 carbon atoms; in the alkyl, any —CH₂— may be replaced by —O—, —S—, —COO—, —OCO— or —CO— and any hydrogen may be replaced by halogen; A³, A⁴ and A⁵ are independently 1,4-cyclohexylene, 1,4-phenylene, pyridine-2,5-diyl, pyrimidine-2,5-diyl, naphthalene-2,6-diyl, fluorene-2,7-diyl, or 1,4-phenylene in which at least one hydrogen is replaced by fluorine or chlorine; B² is a single bond, 1,4-phenylene, naphthalene-2,6-diyl, biphenyl-4,4'-diyl, fluorene-2,7-diyl, 9-methylfluorene-2,7-diyl, 9-ethylfluorene-2,7-diyl, 9,9-dimethylfluorene-2,7-diyl, 9-chlorofluorene-2,7-diyl, 9,9-difluorofluorene-2,7-diyl, or 1,4-phenylene in which at least one hydrogen is replaced by halogen, —CH₃, —CH₂CH₃, —CF₃ or toluyl; Z¹ and Z² are independently a single bond, —COO—, —OCO—, —CH₂CH₂— or —C≡C—; X⁵ and X⁶ are independently a single bond or —O—; q is 1 or 0; p, r and s are independently an integer of 0 to 20.

13. The liquid-crystal composition according to claim 12, wherein the other polymerizable compound is at least one compound represented by Formula (M1).

14. The liquid-crystal composition according to claim 12, wherein the other polymerizable compound is at least one compound represented by Formula (M2).

15. The liquid-crystal composition according to claim 12, wherein the other polymerizable compound is at least one compound represented by Formula (M1) and at least one compound represented by Formula (M2).

16. A polymer obtained by polymerizing the composition of claim 11.

17. A polymer obtained by polymerizing at least one compound of claim 1.

18. An optically-anisotropic shaped article comprising the polymer described in claim 16.

19. The shaped article according to claim 18, which is a film showing hybrid alignment.

20. The shaped article according to claim 18, which is a film showing homogeneous alignment.

21. The shaped article according to claim 18, which is a film showing tilted alignment.

22. The shaped article according to claim 18, which is a film showing homeotropic alignment.

23. An optically-anisotropic shaped article comprising the polymer described in claim 17.

24. The shaped article according to claim 23, which is a film showing hybrid alignment.

25. The shaped article according to claim 23, which is a film showing homogeneous alignment.

26. The shaped article according to claim 23, which is a film showing tilted alignment.

27. The shaped article according to claim 23, which is a film showing homeotropic alignment.

28. The liquid-crystal composition according to claim 8, which has a chiral nematic phase or a cholesteric phase.

29. An optically-anisotropic shaped article showing a helical structure, which comprises a polymer obtained from the liquid-crystal composition described in claim 28.

30. The shaped article according to claim 29, which selectively reflects a part or all of light falling within a region of a wavelength of 350 to 750 nm.

31. The shaped article according to claim 29, which reflects light falling within a region of a wavelength of 100 to 350 nm.

32. The shaped article according to claim 29, wherein the helical pitch continuously varies in the direction of the thickness of the shaped article.

33. An optically-compensatory device composed of the shaped article described in claim 29.

34. A ¼ wavelength functional plate, wherein the shaped article described in claim 29 is used.

35. A ½ wavelength functional plate, wherein the shaped article described in claim 29 is used.

36. An optical device composed of a combination of the shaped article described in claim 29 and a polarizer.

37. A liquid-crystal display device which contains the shaped article described in claim 29.

* * * * *